(12) United States Patent
Kroll et al.

(10) Patent No.: US 12,548,669 B2
(45) Date of Patent: Feb. 10, 2026

(54) MODULAR THERMAL MONITORING

(71) Applicant: Caerus Corp., Blaine, MN (US)

(72) Inventors: Kai Kroll, Plymouth, MN (US); Samantha J. Guldan, New Ulm, MN (US); Daniel T. Wenzel, Little Canada, MN (US); Nicholas A. Engelken, Maple Grove, MN (US)

(73) Assignee: Caerus Corp., Blaine, MN (US)

( * ) Notice: Subject to any disclaimer, the term of this patent is extended or adjusted under 35 U.S.C. 154(b) by 376 days.

(21) Appl. No.: 18/078,848

(22) Filed: Dec. 9, 2022

(65) Prior Publication Data
US 2023/0181107 A1 Jun. 15, 2023

Related U.S. Application Data

(60) Provisional application No. 63/288,449, filed on Dec. 10, 2021.

(51) Int. Cl.
A61N 1/36 (2006.01)
A61B 5/00 (2006.01)
A61B 5/01 (2006.01)
A61B 5/11 (2006.01)
A61F 7/08 (2006.01)
A61F 7/10 (2006.01)
A63B 24/00 (2006.01)
(Continued)

(52) U.S. Cl.
CPC ............. *G16H 40/60* (2018.01); *A61B 5/01* (2013.01); *A61B 5/1118* (2013.01); *A61B 5/48* (2013.01); *A61B 5/4833* (2013.01); *A61B 5/4836* (2013.01); *A61B 5/4842* (2013.01); *A61B 5/7455* (2013.01); *A61F 7/08* (2013.01); *A61F 7/10* (2013.01); *A61N 1/36021*
(2013.01); *A61N 1/36031* (2017.08); *A63B 24/0062* (2013.01); *G01K 3/005* (2013.01); *G01K 13/20* (2021.01); *A61B 2560/0431* (2013.01); *A61B 2560/0443* (2013.01); *A61B 2562/0271* (2013.01); *A61F 2007/0093* (2013.01); *G16H 20/30* (2018.01)

(58) Field of Classification Search
CPC .......................... A61N 1/36031; G16H 40/60
USPC ........................................................ 607/46
See application file for complete search history.

(56) References Cited

U.S. PATENT DOCUMENTS 9,968,797 B2    5/2018  Sham et al.
2015/0297904 A1* 10/2015 Kavounas ............... A61B 5/25
                                                    607/6
(Continued)

OTHER PUBLICATIONS

"International Application Serial No. PCT US2022 052424, International Search Report mailed Mar. 23, 2023", 3 pgs.
(Continued)

Primary Examiner — Nadia A Mahmood
(74) Attorney, Agent, or Firm — Nelson Mullins Riley & Scarborough LLP

(57) ABSTRACT

Systems and methods to determine an indication of patient compliance to a prescribed treatment are disclosed, including receive temperature information from a first temperature sensor in a housing of a self-contained monitoring device and from a second temperature sensor located outside of the housing of the self-contained monitoring device, receiving an indication of a prescribed treatment, and determining an indication of patient compliance to the prescribed treatment using the received temperature information occurring over a first period.

20 Claims, 18 Drawing Sheets

(51) Int. Cl.
*G01K 3/00* (2006.01)
*G01K 13/20* (2021.01)
*G16H 40/60* (2018.01)
A61F 7/00 (2006.01)
G16H 20/30 (2018.01)

(56) References Cited

U.S. PATENT DOCUMENTS

2016/0213924 A1 7/2016 Coleman et al.
2021/0228260 A1 7/2021 Canady, Jr. et al.

OTHER PUBLICATIONS

"International Application Serial No. PCT US2022 052424, Written Opinion mailed Mar. 23, 2023", 6 pgs.

* cited by examiner

1500

RESULTS

KNEE RANGE OF MOTION

| ROM ANGLE | MAX VELOCITY |
| 145° | 101°/S |

WALK

| TIBIAL INCLINATION RATE | TIBIAL INCLINATION |
| 28° | 32°/S |

SIT DOWN, STAND UP

OF STAND UPS
13

PATIENT DETAILS

| DATE | TIME | PAIN | PROMPT | M1 | M2 | M3 | M4 | M5 | M6 |
|------|------|------|--------|----|----|----|----|----|-----|
|      |      |      |        |    |    |    |    |    |    |
|      |      |      |        |    |    |    |    |    |    |
|      |      |      |        |    |    |    |    |    |    |
|      |      |      |        |    |    |    |    |    |    |
|      |      |      |        |    |    |    |    |    |    |

*FIG. 16*

MODULAR THERMAL MONITORING

CLAIM OF PRIORITY

This application claims the benefit of priority under 35 U.S.C. § 119(e) of U.S. Provisional Patent Application Ser. No. 63/288,449, filed on Dec. 10, 2021, which is herein incorporated by reference in its entirety.

TECHNICAL FIELD

This document relates generally to patient monitoring and more particularly, but not by way of limitation, to systems and methods for modular thermal monitoring.

BACKGROUND

Therapeutic treatments can be prescribed and subsequently provided to a body part of a patient, in certain examples, through application of electrical or thermal energy by a treatment device, or directed rest or activity, remote from a clinical setting. However, patient compliance with prescribed treatment and progress in the remote setting, away from the clinical setting, remains unreliable and difficult to track and quantify.

SUMMARY

Systems and methods to determine an indication of patient compliance to a prescribed treatment are disclosed, including receive temperature information from a first temperature sensor in a housing of a self-contained monitoring device and from a second temperature sensor located outside of the housing of the self-contained monitoring device, receiving an indication of a prescribed treatment, and determining an indication of patient compliance to the prescribed treatment using the received temperature information occurring over a first period.

This summary is intended to provide an overview of subject matter of the present patent application. It is not intended to provide an exclusive or exhaustive explanation of the disclosure. The detailed description is included to provide further information about the present patent application. Other aspects of the disclosure will be apparent to persons skilled in the art upon reading and understanding the following detailed description and viewing the drawings that form a part thereof, each of which are not to be taken in a limiting sense.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 14-16 illustrate example management and results interfaces.

DETAILED DESCRIPTION

Figure 1:
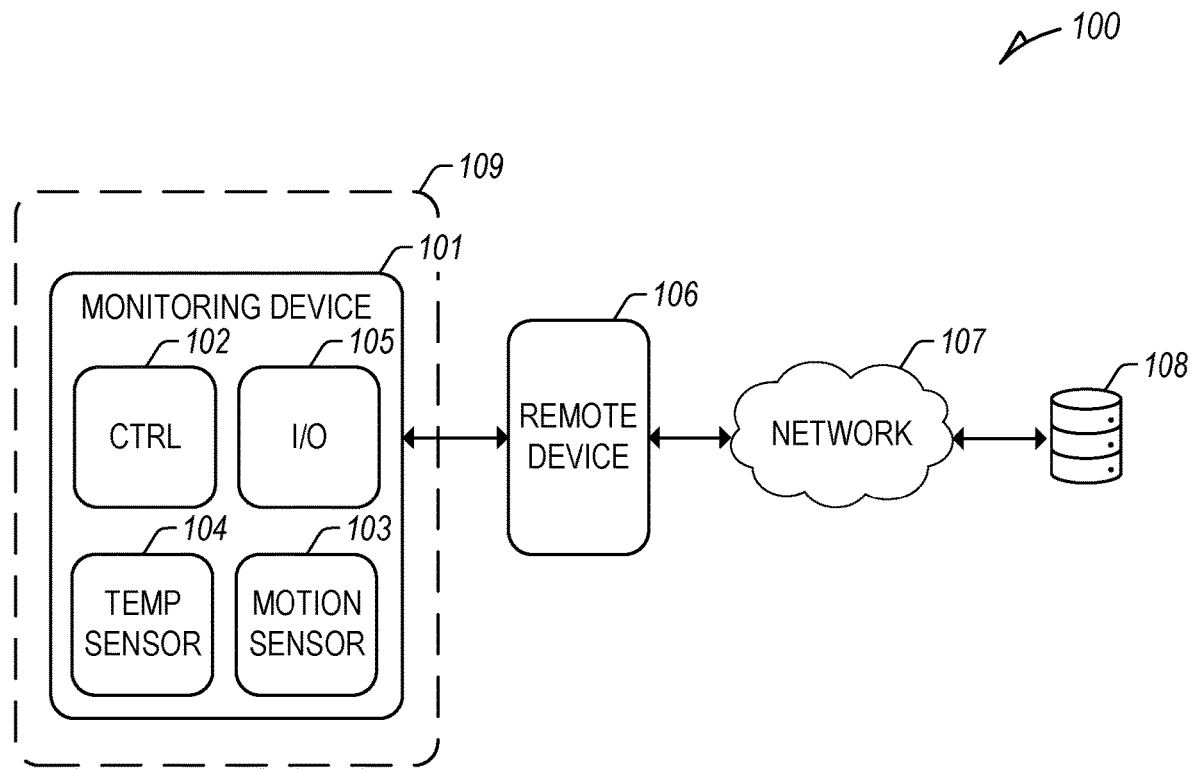
FIG. 1 illustrates an example therapy device system.

Treatment efficacy is generally determined based on patient response to a prescribed treatment. However, patient compliance with prescribed treatment is often unreliable and self-reporting can be inaccurate. Changes in prescribed treatment or follow-up treatment can be determined by clinical observation but are often based on self-reported client progress and the belief that the patient has complied with the previously prescribed treatment.

As remote patient monitoring and remote medicine continue to grow, there is a need, from different perspectives, to provide improvements. For example, from a clinician perspective, there is a need to determine and provide a more reliable indication of patient compliance to ensure that the patients are using treatment devices as prescribed and adhering to prescribed treatment protocols. There is a further need to remotely determine objective measures of patient progress, such that treatment can be adjusted within ranges automatically or without substantive clinician interaction. From a patient perspective, there is a need to more easily and immediately receive feedback regarding treatment application and protocols (e.g., including periods of activity as well as periods of rest or limited activity) to improve treatment efficacy and recovery. From a reimbursement perspective, there is a need to ensure that clinicians and patients are prescribing and carrying out treatments as intended and directed.

Electrical and thermal therapy can be applied through one or more treatment devices, in certain examples, such as described in the commonly assigned U.S. Pat. No. 9,968,797 titled "Electromagnetic Thermal Therapy" (herein "the '797 patent), incorporated by reference in its entirety, including its disclosure of electrical stimulation and thermal therapies, including applying pulsed electromagnetic field stimulation in combination with thermal (hot or cold) therapy, such as through one or more single-use thermal exchange components.

Initial prescribed treatment, such as from a clinician or other caregiver, often includes a set of instructions and materials to provide the prescribed treatment. For example, for the treatment device described in the '797 patent, an initial prescribed treatment could come with an initial quantity of single-use thermal exchange components for use by the patient to provide thermal therapy. One way to verify use of the therapy device is by patient re-order of additional thermal exchange components. However, reorder itself is not a dispositive indication of use. Patients often fail to re-order in time or use at a higher or lower rate than prescribed, resulting in periods of missed treatment.

Even electrically recorded periods of applied therapy, such as recorded by one or more control circuits of a treatment device, are not dispositive indications that the patient has correctly applied or received the prescribed treatment, only that a control signal was provided to activate a therapy.

The present inventors have recognized, among other things, a need for reliable, robust remote monitoring of device performance and patient compliance, to automatically provide updated remote therapy instructions, improve reordering of single-use or replaceable therapy components, enable automatic replacement of malfunctioning components, as well as perform remote detection of various patient conditions, including determining and detecting changes in patient condition.

In addition, the present inventors have recognized modular systems that can be adopted and incorporated into any number of existing devices and treatments. Improving patient monitoring and compliance can advance remote patient monitoring programs, generally reducing the burden on the healthcare system. Adapting treatment devices to show patient improvement may improve patient compliance, increasing patient retention and improving treatment efficacy.

FIG. 1 illustrates an example system 100 including a monitoring device 101, a remote device 106, and a remote patient database 108 coupled through a network 107. In certain examples, the monitoring device 101 can be a component of, coupled to, or in other examples, separate from but used in conjunction with one or more treatment devices, such as a treatment device 109. In other examples, the monitoring device 101 can be used separately from the treatment device 109, or in certain examples, as one of multiple monitoring devices on a single patient or treatment device 109, such as to monitor patient information differences across the body, motion imbalance, general changes in patient condition, reduction of blood flow to an extremity, hypothermia, hyperthermia, etc.

The monitoring device 101 can include a control circuit 102, a motion sensor 103 to detect physical activity information (e.g., from a patient or the treatment device 109), a temperature sensor 104 to detect temperature information (e.g., from the patient or the treatment device 109), and an input/output interface 105 including, for example, a physical connector (e.g., a micro-USB or USB-C connector, a wireless communication interface (e.g., a Bluetooth communication circuit, a wireless fidelity ("Wi-Fi") communication circuit, etc.), or one or more other components in various combinations and permutations to communicate information into or out of the monitoring device 101, such as to provide one or more determined indications to a user or process.

The control circuit 102 can be configured to make one or more determinations of patient compliance or patient condition, such as using the detected physical activity information, the detected temperature information, or combinations thereof. In certain examples, the monitoring device 101 can include one or more other components or circuits in various combinations, such as a battery to support the electronics of the monitoring device 101 (e.g., having a capacity to power the monitoring device for at least 31 days, etc.), etc. In other examples, the monitoring device 101 can be a rechargeable device. The monitoring device 101 can include high and low power states to manage power consumption between clinic visits, charges, etc.

In an example, the motion sensor 103 can include a single- or multi-axis accelerometer, a gyroscope, a piezo-electric accelerometer, a piezoresistive accelerometer, a capacitive accelerometer, or one or more other motion or activity sensors, etc. The temperature sensor 104 can include a thermistor, a temperature-sensitive resistor, or one or more other temperature sensors, etc. In an example, the monitoring device 101 can include the motion sensor 103 and not the temperature sensor 104. In another example, the monitoring device 101 can include the temperature sensor 104 and not the motion sensor 103. In other examples, the monitoring device 101 can include both the motion sensor 103 and the temperature sensor 104.

In an example, the motion sensor 103, the temperature sensor 104, one or more other sensors (e.g., a stretch sensor, etc.), or combinations thereof can be integrated into the treatment device 109 for detecting physical activity information of the patient (e.g., motion data of the patient), to determine compliance with a prescribed treatment, or to measure or determine patient condition with respect to one or more therapeutic outcomes, such as to determine improved or worsened patient condition, etc. In certain examples, the monitoring device 101 can share a power source or processing or data storage resources with the treatment device 109. In other examples, the electronics of the monitoring device 101 and the treatment device can be separate.

In an example, the treatment device 109 can include a treatment device control circuit configure to control one or more therapies or actions of the treatment device 109, including storing a record or time stamp of actions (e.g., provided therapy) separately from the monitoring device 101. The treatment device 109 can include or be adapted to carry or support the monitoring device 101. In an example, the control circuit 102 of the monitoring device 101 can be configured to communicate with, or be coupled to, the control circuit of the treatment device 109, such that times of provided treatments can be compared to times of detected activity, etc. In other examples, the monitoring device 101 can be configured to communicate with one or more remote devices, such as the remote device 106.

In an example, the monitoring device 101 can be coupled to a remote database 108 through a network 107, in certain examples through the remote device 106, and in other examples the monitoring device 101 can be coupled to the network 107 directly, such as using one or more wireless communication interfaces, etc. In an example, one of more of the remote device 106 or the remote database 108 can be cloud-based components accessible through the network 107, including by the remote device 106.

In certain examples, the remote device 106 can include a mobile device (e.g., a user device, a smartphone, etc.) configured to receive information from the monitoring device 101, such as physical activity information from the motion sensor 103, temperature information from the temperature sensor 104, or one or more determinations of the control circuit 102, such as a determination of an indication of patient compliance or patient condition using the detected or received physical activity information of the patient.

In an example, the remote device 106 can execute an application (e.g., a mobile app) configured to interface or interact with the monitoring device or a treatment device 109, such as to provide information to the monitoring device 101, such as one or more indications of a desired treatments or activities (e.g., prompts), to receive information from the treatment device 109 (e.g., specific applied treatment parameters and times, etc.), etc. In certain examples, the remote device 106 can be configured to manage re-order of single-use therapy components, such as associated with received indications of applied treatments including therapy associated with components requiring re-order.

In certain examples, the remote device 106 can be configured to interact with one or more of the remote database 108, the monitoring device 101, or one or more treatment devices. In an example, the treatment device control circuit can provide information to the control circuit 102 of the monitoring device 101, so the monitoring device 101 can prepare to receive information from or associated with the patient in response to an applied treatment episode or duration. In other examples, the control circuit 102 of the monitoring device 101 can provide information to the treatment device 109, such that the therapy applied by the treatment device 109 can be adjusted by feedback sensed or determined by the monitoring device 101.

In an example, the remote device 106 can include a computer or database at a clinic or hospital, such as a clinic computer, etc. Information sensed or determined by the monitoring device 101 can be retained for download by a clinic computer or upload to one or more clinic resources, such as triggered prior to or during a clinician visit, etc. If the patient associated with the monitoring device 101 did not have a remote or other electronic device to execute an application to allow the patient or one or more other user or caregiver to receive information from or interact with the monitoring device 101 or treatment device 109, the clinic could still receive the determinations and information from the monitoring device 101. In such examples, the control circuit 102 can include additional storage resources to store information prior to or between connections, clinic visits (e.g., more than 31 days, etc.). The connection to the clinic computer, whether wired or remote, can also allow for firmware updates for patients not having a connected mobile application or remote device 106 of their own.

FIGS. 2-8 illustrate example treatment devices (or treatment wraps) configured for use on different areas of a body. The treatment devices can be configured worn on, around, or proximate to (or otherwise positionable at) an associated portion of the body or treatment location to deliver pain relief or treatment to a patient, and can include a thermal therapy component (e.g., one or more thermal exchange components, hot or cold, or an electrical heating component, etc.), an electrical therapy component (e.g., an electromagnetic field therapy component), a treatment device control circuit 120, and a monitoring device 101 including one or more sensors, such as one or both of a motion sensor 103 or a temperature sensor 104.

The thermal therapy component can include one or more single- or multiple-use heat or cold thermal therapy pods or packs (e.g., air- or mixture-activated endothermic or exothermic packs, etc.). In other examples, the thermal therapy component can include one or more electrical heating elements to provide thermal therapy. The electrical therapy element can include one or more applicator coils and stimulator circuits configured to deliver an electromagnetic field to a target location of the patient. The treatment device control circuit 120 can include the stimulator circuits as well as other circuits of the treatment device to control or apply one or both of heat and electrical therapy. In other examples, the thermal therapy component can include an electrical heat source separate from or in combination with single- or multiple-use heat or cold thermal therapy pods or packs.

A method of using the example treatment devices can include the steps of: (1) activating thermal therapy; (2) activating electrical therapy according to one or more programmed treatment parameters; (3) activating or executing an application on a remote device (e.g., a user device, a smartphone, etc.) and establishing a connection between the application and the monitoring device 101; (4) detecting and recording physical activity information sensed by the monitoring device 101; and (5) determining completion of a directed treatment and ending a therapy session using the detected physical activity information.

Figure 2:
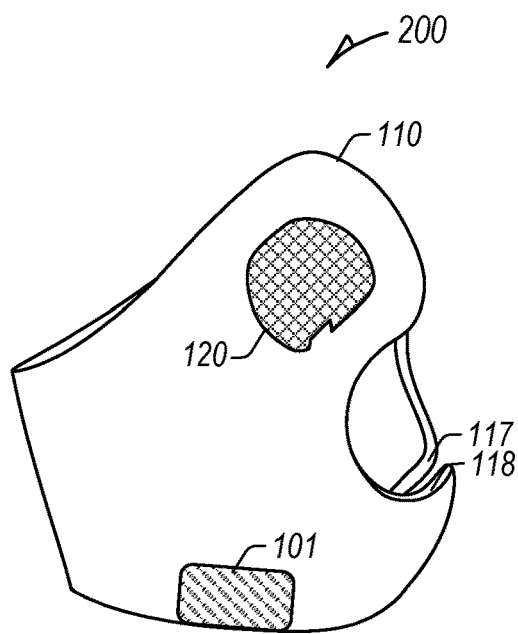
FIGS. 2-8 illustrate example treatment devices for different treatment areas of a body.

FIG. 2 illustrates an example treatment device 200 including a knee wrap 110 (or cuff) having a monitoring device 101 in or on the knee wrap 110 at a location such that, when worn by a patient, the monitoring device 101 is located on an outside knee (medial or lateral) portion of the knee wrap 110 at the lower-most position having the longest moment arm with respect to patient movement or flexion of the knee. The knee wrap 110 includes first and second overlapping portions 117, 118 configured to secure the knee wrap 110, such as by hook-and-loop closure, on the knee, and a treatment device control circuit 120 to control one or both of heat and electrical therapy by the treatment device 200.

For each treatment device illustrated in FIGS. 2-8, the present inventors have recognized, among other things, that placing the monitoring device 101 on the treatment device or treatment wrap at the longest moment arm on the wrap with respect to movement of the associated body part improves sensing of patient activity, especially with respect to a prescribed therapy to a specific body part as part of recovery to an injury.

For example, if prescribed the treatment device 200 with respect to knee pain or recovery from a knee injury, placing the monitoring device 101 at the lower medial or lateral position on the knee wrap 110 enables more accurate detection of flexion and movement of the knee. Similar situations are illustrated with respect to the remaining devices and associated body parts or treatment locations. The monitoring device 101 in FIGS. 3-8 are each placed at positions of the longest moment arm where the monitoring device 101 can be located on the respective treatment devices.

As used herein, the longest moment arm can be relative to the possible placement of the monitoring device, such that the monitoring device 101 can be placed at a position of a substantially large moment arm with respect to the treatment device 200. For example, in FIG. 2, the monitoring device 101 will not overlap the edge of the knee wrap 110, or even overlap a seam at the edge. Positioning the monitoring device 101 near the point of the actual largest moment arm (e.g., within a length of the monitoring device 101, two lengths of the monitoring device, etc.), without interfering with the functioning of the treatment device 200 or the knee cuff 110, can provide a substantially large moment arm, with similar situations with the other treatment devices described herein.

In an example, the knee wrap 110 can be configured for use with one of a left knee or a right knee, specifically, having components with mirrored locations for each version. In such example, it may be advantageous to place the monitoring device 101 at a lateral portion of the knee wrap 110, so as to not interfere with the other knee, etc. However, from a manufacturing efficiency standpoint, it can be advantageous to manufacture one brace designed for use with both knees, and as such, when used with one knee, the monitoring device 101 can be located at a lateral portion of the knee wrap 110, and when used with the other knee, the monitoring device 101 can be located at a medial portion of the knee wrap 110. Although less idea with respect to the individual knees, this does allow a patient or one or more other user or caregiver to order one treatment device 200 and use the one device intermittently to treat both knees, instead of ordering one for each knee separately.

In certain examples, the patient can communicate with the monitoring device 101, such as through an application on a remote device, to communicate which body part the treatment device is being used with, in certain examples, alternating between the left and right body parts with the same treatment device, and determining patient progress respectively for each.

Figure 3:
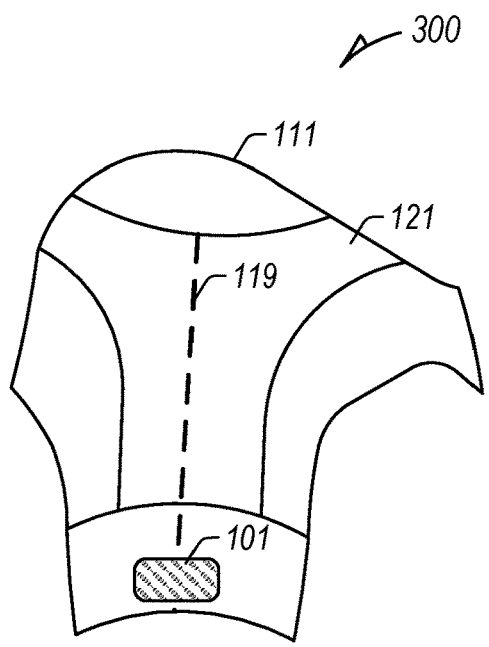

FIG. 3 illustrates an example treatment device 300 including a shoulder wrap 111 having a monitoring device 101 in or on the shoulder wrap 111 at a location such that, when worn by a patient, the monitoring device 101 is located on an outside arm (lateral) portion of the shoulder wrap 111, at the lower-most position having the longest moment arm with respect to patient movement of the arm in the shoulder joint along a center line 119 from the pivot point of the shoulder joint down the humerus. The shoulder wrap 111 optionally includes a tightening portion 121 to provide tension or stability to the shoulder.

Figure 4:
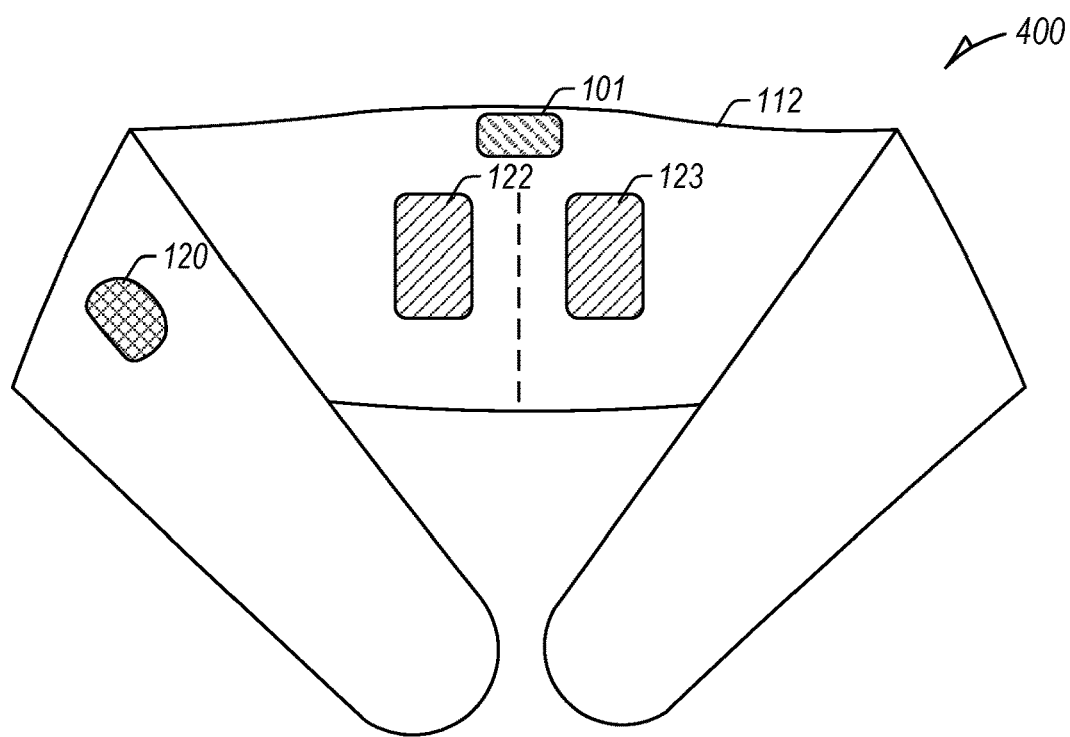

FIG. 4 illustrates an example treatment device 400 including a back wrap 112 (lumbar wrap) having a monitoring device 101 in or on the back wrap 112 at a top-most portion of the back wrap 112 such that, when worn by a patient (e.g., secured around the lower back by hook-and-loop closure, etc.), the monitoring device 101 is located at a top-most center position along the lumbar vertebrae having the longest moment arm with respect to patient movement or flexion of the back. The back wrap 112 includes first and second thermal therapy components 122, 123 to provide thermal therapy to the lower back, and a treatment device control circuit 120 to control one or both of heat and electrical therapy by the treatment device 400.

Figure 5:
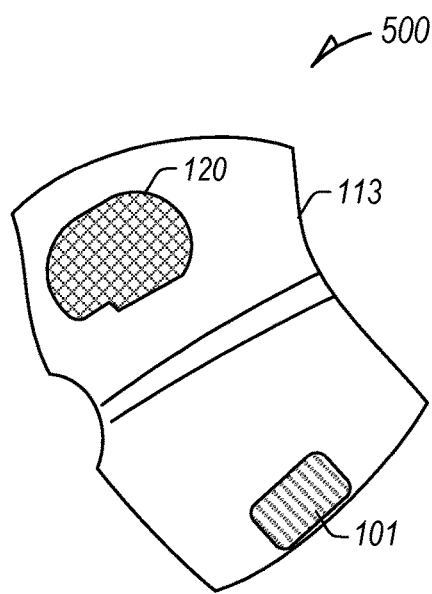

FIG. 5 illustrates an example treatment device 500 including an elbow wrap 113 (or sleeve) having a treatment device control circuit 120 to control one or both of heat and electrical therapy by the treatment device 500 and a monitoring device 101 in or on the elbow wrap 113 at a location such that, when worn by a patient, the monitoring device 101 is located on an outside elbow (lateral) portion of the elbow wrap 113 at the lower-most position having the longest moment arm with respect to patient movement, flexion, or rotation of the forearm relative to the elbow joint.

Figure 6:
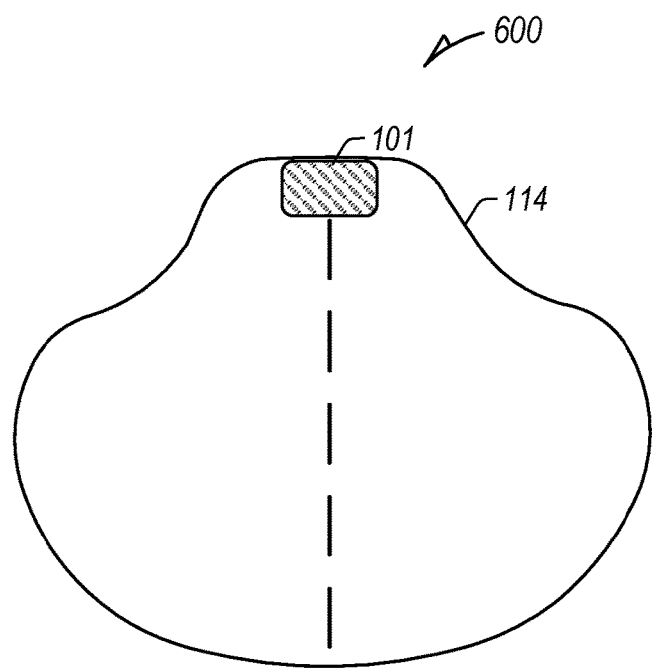

FIG. 6 illustrates an example treatment device 600 including a neck wrap 114 (cervical wrap) having a treatment device control circuit 120 to control one or both of heat and electrical therapy by the treatment device 600 and a monitoring device 101 in or on the neck wrap 114 at a top-most portion of the neck wrap 114 such that, when worn by a patient, the monitoring device 101 is located at a top-most center position along the cervical vertebrae having the longest moment arm with respect to patient movement or flexion of the neck or upper spine.

Figure 7:
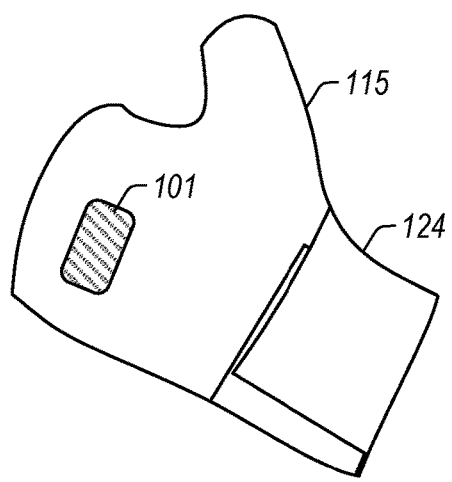

FIG. 7 illustrates an example treatment device 700 including a wrist wrap 115 having a monitoring device 101 in or on the wrist wrap 115 at a top-most portion of the wrist wrap 115 such that, when worn by a patient, the monitoring device 101 is located at a top-most position on the back of the hand having the longest moment arm with respect to patient movement or flexion of the wrist relative to the forearm.

Figure 8:
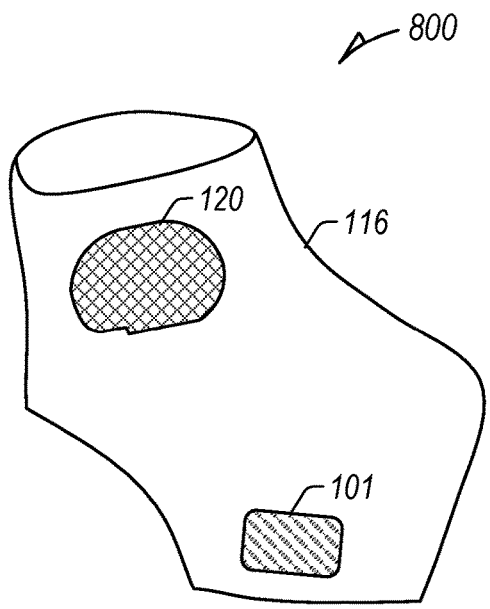

FIG. 8 illustrates an example treatment device 800 including an ankle wrap 116 having a treatment device control circuit 120 to control one or both of heat and electrical therapy by the treatment device 800 and a monitoring device 101 in or on the ankle wrap 116 on an outside foot (medial or lateral) portion of the ankle wrap 116 at the lower-most position having the longest moment arm with respect to patient movement or flexion of the foot or ankle relative to the tibia.

Figure 9:
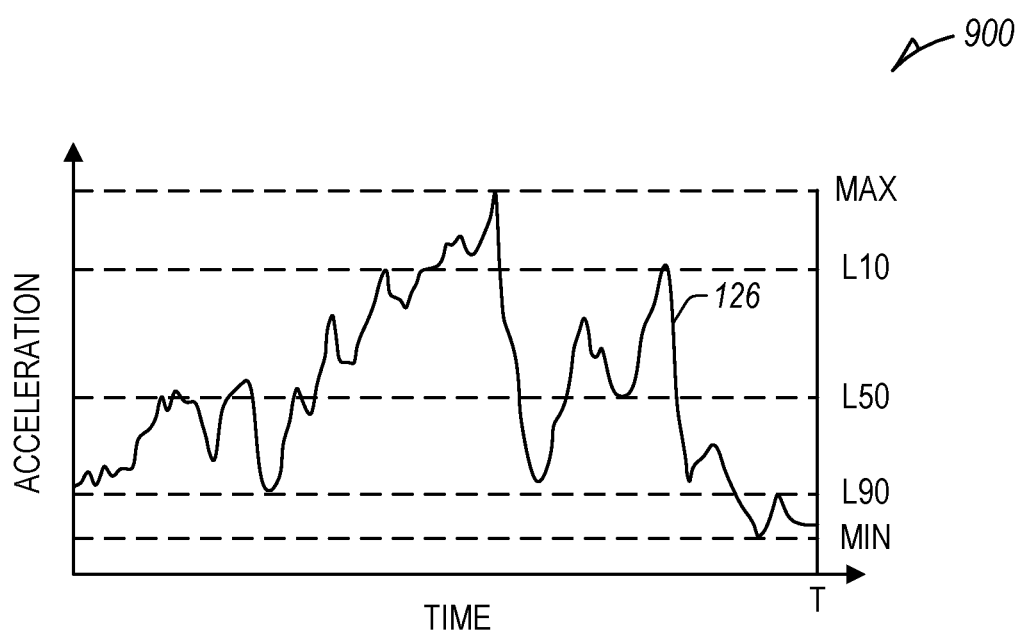
FIG. 9 illustrates example physical activity information from a motion sensor and determined physical activity levels.

FIG. 9 illustrates example relationship 900 of physical activity information 126 from a motion sensor and determined activity levels (e.g., MAX, L10, L50, L90, and MIN) for a treatment period, per unit time (e.g., across multiple treatment periods, portions of a day, daytime, nighttime, daily, weekly, monthly, or trends thereof, etc.), or at one or more other time scales and used to determine compliance with prescribed treatment, treatment device operation, adjusting prescribed treatment or treatment parameters, changing one or more prompts, determinations of patient condition, etc., in different combinations or permutations.

For example, patients in pain generally move less, or with a lower intensity than those in a correspondingly better condition. Accordingly, one or more measures of patient activity representative of activity levels can be tracked or trended to determine if the patient condition is improving, stable, or worsening.

In an example, physical activity information can be monitored or recorded for a period of time (e.g., a day, etc.). Different percentage levels of the physical activity level magnitude per unit time (e.g., area under the curve in FIG. 9) can be determined. In certain examples, the determined levels and changes in the determined levels over time can be used to determine patient improvement or worsening. For example, the level L10 in FIG. 9 is representative of the top 10% of the area under the curve in FIG. 9. The value of L10 corresponds to a certain level, lower with one or a small number of spikes in otherwise lower information, but higher if all information is higher. Increases can indicate an improving patient condition. Similarly, the levels L50 and L90 in FIG. 9 are representative of the top 50% and 90% of the area under the curve in FIG. 9, respectively. Increase pain is generally related to decreases in the determined activity levels. In other examples, variance in the levels or between them can be used to determine changes in patient condition. Further, separate from the value of the levels, the time at the respective levels can also be used to indicate patient condition, and in certain examples, patient compliance information. For example, if the time period in L50 is less than the prescribed treatment times for the prescribed treatment, it is unlikely that the patient performed treatment that day. Variance between the times in the different levels can be indicative of general activity. A smaller variance in the different levels is generally associated with less activity.

For example, in certain examples, the detected physical activity information can indicate that the patient is not in compliance with prescribed treatment, such as not using the prescribed treatment, although improving in patient condition, such as by demonstrating an overall increase in physical activity information of the patient, improved patient sleep (such as confirmed using the detected physical activity information, etc.), etc.

In an example, therapy treatment parameters, such as the length of time of treatment session or the number of therapy sessions per day, can be determined or adjusted in response to detected physical activity information. In an example, an application on the remote device can prompt or direct the patient to perform certain motions or activities, as well as provide information about any provided treatment, such as duration, intensity, history, etc. Patient compliance can be determined using the received physical activity information and therapy information for each therapy session, such as detecting aggregate patient physical activity information above a threshold during the activated thermal or electrical therapy, each of which, activity information and therapy information, can be recorded (or detected) and compared. Compliance information, once determined, can be recorded across a number of therapy sessions and shared based on detected treatment times and provided to a clinician for review, including comparing the number of therapy sessions to the number of prescribed therapy sessions.

Once received, the physical activity information can be used to determine relative patient activity levels, either as a function of the minimum and maximum or different levels of observed activity information in the patient or using more static activity levels associated with values from the motion sensor, in certain examples gated between treatment periods (e.g., directed or prompted activity) or outside of treatment periods, if such information is available. Useful metrics for measurement include, in various combinations or permutations, measurements or determinations of daily or one or more other time periods of: steps; acceleration-based activity levels (e.g., time at or above a high activity threshold, time between low and high activity thresholds, and a time below the low activity threshold, etc.); time in motion; time not in motion; a determined RMS value of activity information; etc. Activity levels can be patient specific, based on general population data, or determined using combinations thereof.

In certain examples, the determined activity levels illustrated in FIG. 9 can be used to determine relative periods of high, medium, low, or no activity, such as by assigning L10 and above to be high activity, between L10 and L50 to be medium activity, between L50 and L90 to be low activity, and below L90 to be no activity.

In certain examples, one or more prompts can be provided to the patient, such as by the remote device, instructing the patient to perform a directed movement from which a measurement device can receive physical activity information to determine subsequent treatment, patient condition, etc. At a time of prescribed treatment, a notification can be provided on the remote device, on the treatment device, emailed or otherwise provided to the patient, or combinations thereof, etc., to perform the directed movement.

Figure 10:
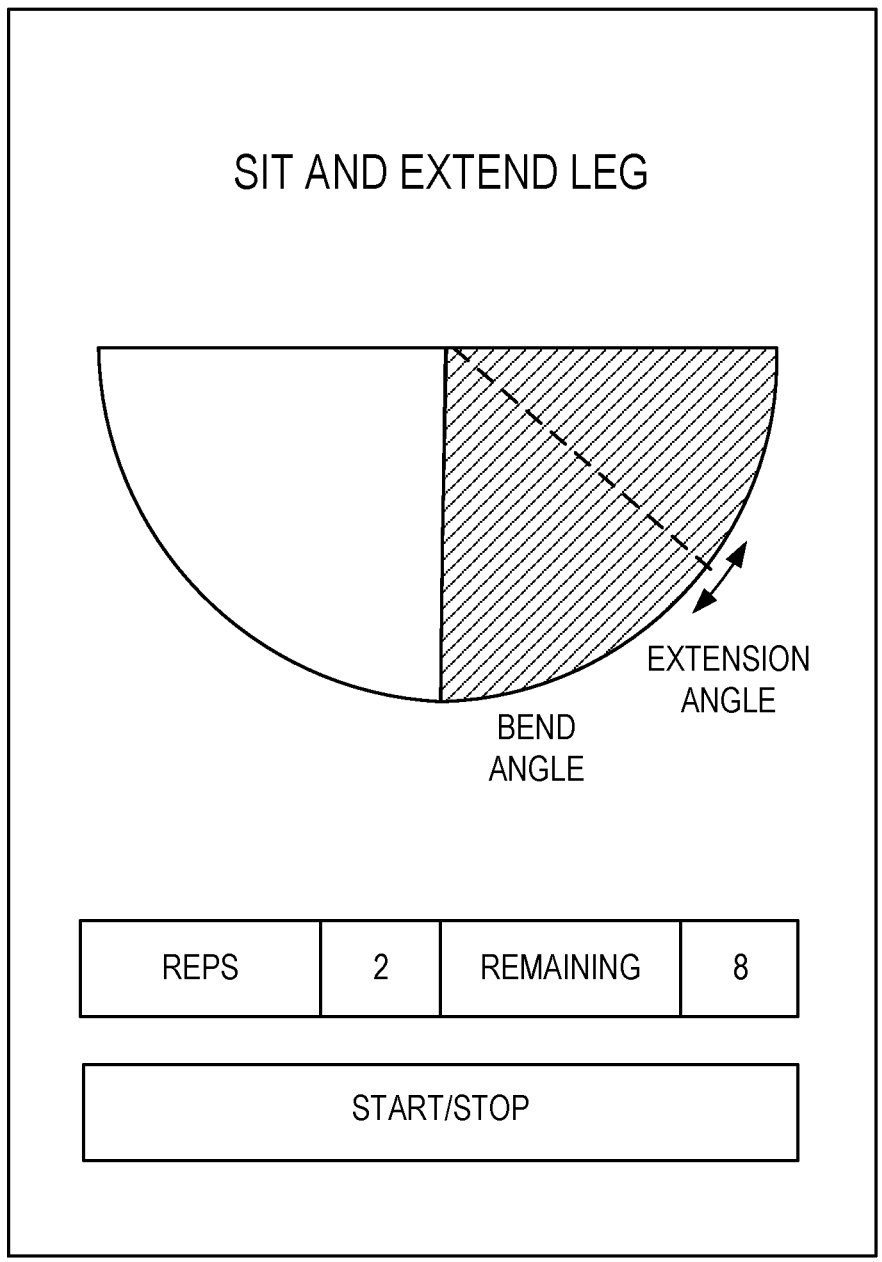
FIGS. 10-12 illustrate example directed movements from which to receive physical activity information.

FIG. 10 illustrates an example directed movement 1000 to direct the patient to extend and contract a leg, such as in the case of the patient having a knee wrap, pain in the knee, or is recovering from an injury to the knee, etc. The directed movement 1000 includes a prompt to perform a number of reps (e.g., as far as possible) and a button to start and stop the directed movement. The directed movement 1000 further includes a rep counter to prompt the patient to perform the required additional reps. The shaded extension value can represent the average extension and bend angle, the desired extension and bend angle, or the extension and bend angle for the current rep or last performed rep, changing as the patient performs the rep or additional reps. Further, the angular velocity (or speed of movement) can be detected and measured. Faster movement is indicative of decreased pain and stiffness about the joint.

Figure 11:
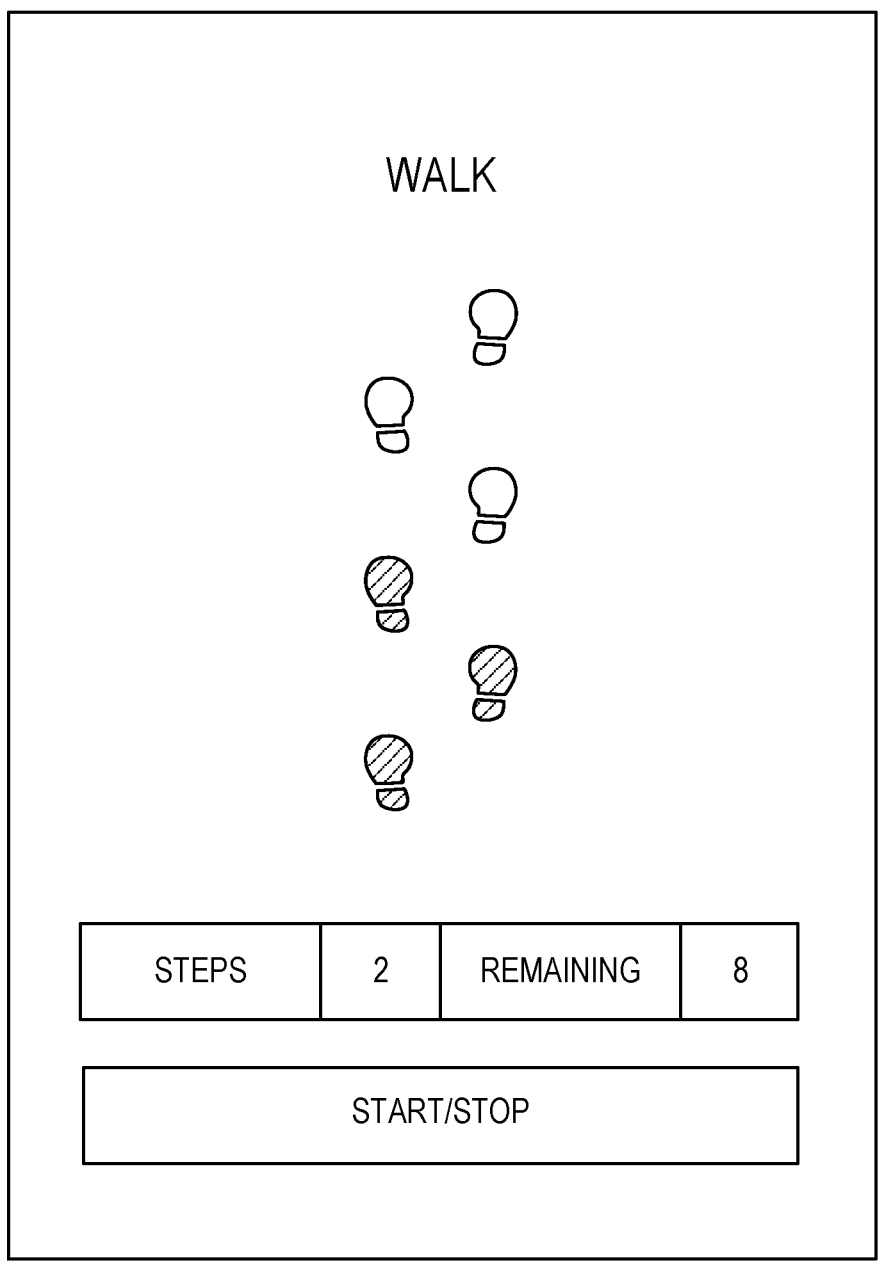

FIG. 11 illustrates an example directed movement 1100 to direct the patient to take a number of steps, such as in the case of the patient having a lower body injury or imbalance, etc. The directed movement 1100 includes a prompt to take a number of steps and a "Done" button to select following completion of the directed steps. The directed movement 1100 further includes a step counter to prompt the patient to take the required additional steps. The tibial inclination range of motion forward and backward during the gate between toe off and heel strike can be measured (e.g., the swing phase of the gait cycle), as well as tibial angular velocity. Like above, faster and more movement is indicative of improved mobility, stability, and decreased pain and stiffness.

Figure 12:
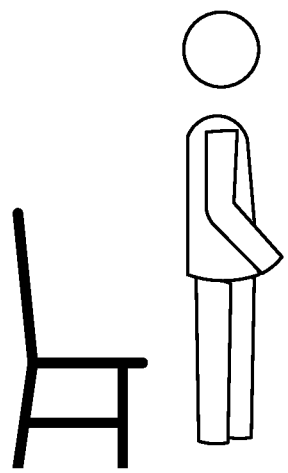

FIG. 12 illustrates an example directed movement 1200 to direct the patient to sit down and stand up, such as in the case of the patient having a lower body injury or imbalance, etc. The directed movement 1200 includes a prompt to sit down and stand up as many times as the patient can in a given time period, and a button can be selected to start or stop the directed activity. The directed movement 1200 further includes a step counter and a timer to prompt the patient to stay active throughout the test duration. Generally, the patient will be able to perform a greater number of repetitions as they are improving. Specifically, sit-down and stand-up improvements are indicative of a decreased pain in the knee, allowing for increased freedom of movement and increased functional strength in the lower body, indicating that the patient is likely spending more time on their feet gaining functional strength and endurance.

Activity information between the prompt or the selection of the start button and when the patient hits the stop button can be measured and recorded and compared to a threshold to determine patient compliance for that treatment duration, whereas patient condition can be determined based on magnitude or time differences of the activities themselves in the treatment duration in contrast to another treatment duration (or in of case no previous or similar treatment, to general population data, etc.). In certain examples, patient compliance can be detected if the measured and recorded physical activity information meet the prescribed treatment schedule (e.g., or quantity), whereas patient condition can be determined based on analysis of the time or magnitude of the relative changes between different activities or activity periods (e.g., or quality).

Figure 13:
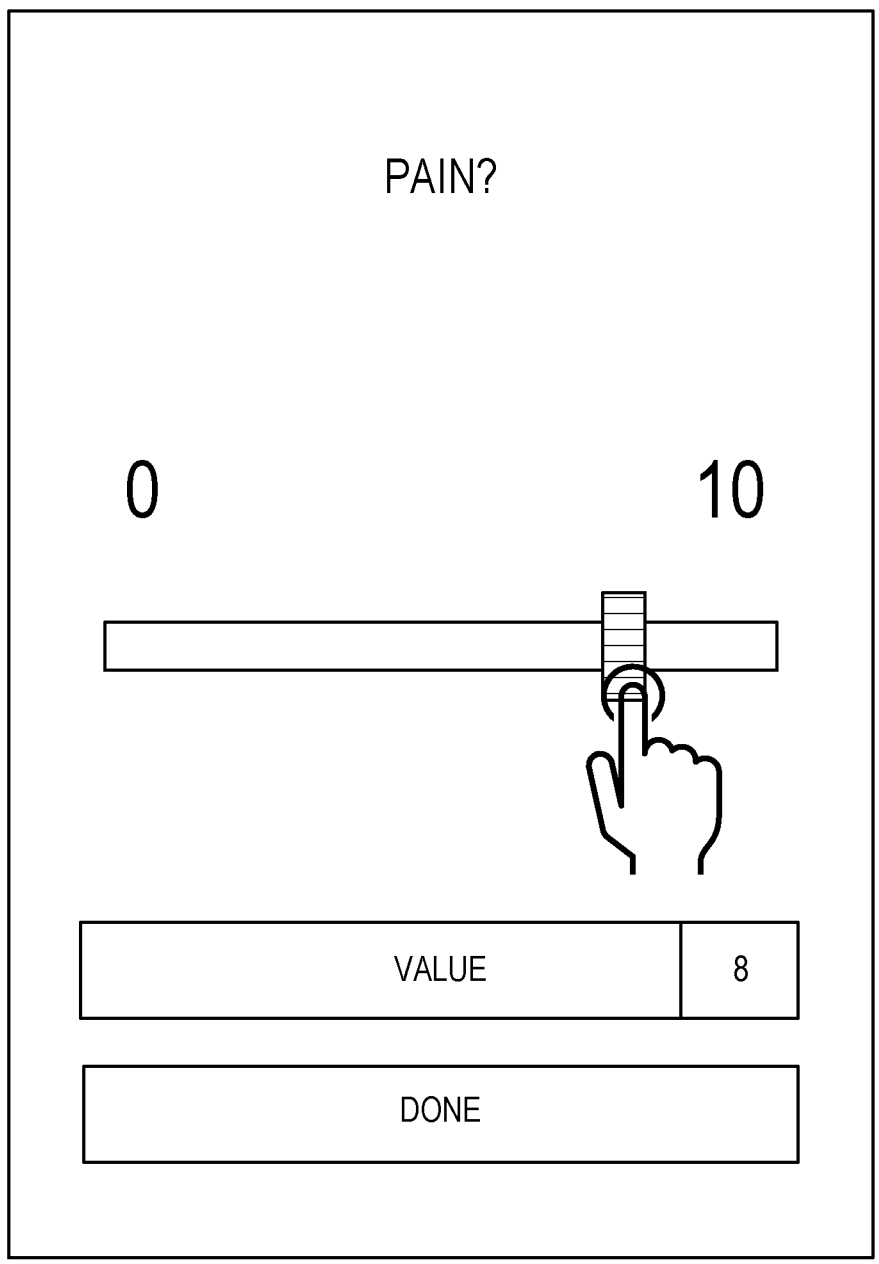
FIG. 13 illustrates an example interface to receive patient feedback.

FIG. 13 illustrates an example interface 1300 to receive patient pain feedback, for example, using a slidable patient input. In certain examples, patient pain levels can be determined using detected patient physical activity information. For example, self-reported patient pain levels, such as received through the remote device, can be correlated to detected patient physical activity information and increases or decreases in detected patient physical activity information or self-reported patient pain levels can be used to adjust the determined pain level. In certain examples, the application executed on the remote device can be configured to push notifications to the patient to record patient pain levels on the remote device (e.g., a user device, a smartphone, etc.). In addition, the remote device can provide directed patient motions or exercises, such as range of motion, squat, flexion of a joint, or walking to determine patient gait analysis, such as using detected physical activity information, etc. Correlating pain and activity level of the patient can enable more automated adjustment of programmed treatment parameters without waiting for patient feedback, improving patient experience and recovery, and increasing the likelihood of the patient continuing treatment.

Figure 14:
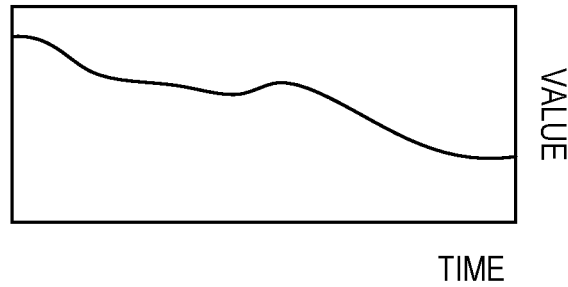
Figure 14:
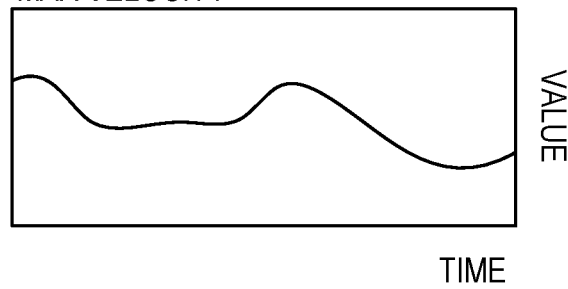

FIG. 14 illustrates an example recovery management interface 1400 illustrating knee range of motion (ROM) and velocity values with respect to time, such as the time of a single treatment duration (e.g., seconds or minutes), a daily time or longer covering multiple treatment durations, or one or more other durations. The example recovery management interface 1400 illustrated in FIG. 14 shows decreasing trends and thus indicates that, although the patient may be complying with the prescribed treatment, the patient is exhibiting a worsening patient status.

FIG. 15 illustrates an example results interface 1500 illustrating summary results from the directed movements prompted and performed in FIGS. 10-12, such as for review by the patient or one or more other users or caregivers. In an example, such results can be used to determine compliance, but without other data to compare it to, such results alone cannot be used to determine an indication of worsening or improving patient condition.

FIG. 16 illustrates an example patient details interface 1600 illustrating summary results for a patient or a group of patients, such as from a remote database for review by a clinician or caregiver, a customer care provider, a reimbursement representative, or one or more other users separate from the patient, etc. The patient details interface 1600 includes a pie chart of different activity levels (e.g., high, medium, and low, illustrated by "A", "B", and "C", respectively) and bar charts of patient condition progress over time. In certain examples, different tables can include other information, such as patient progress showing patient results over time and different usage information, pain information, completion of directed assessment information, and a number of metrics determined over a number of different treatments or motions (e.g., M1-M6, etc.). The illustrated patient can be selected by the user from a list of patients for review.

The present inventors have recognized, among other things, that temperature sensing can be used to determine the proper functioning of thermal therapy components, but also to determine accurate use of the therapy device, such as compliance with prescribed instructions. From a temperature perspective, the human body is generally warmer than ambient temperature, but also acts as a heat sink. Temperature rise times and steady-state differentials between different locations can be used to determine patient compliance, in certain examples, with physical activity information.

Temperatures from different locations on the device (e.g., proximate to or distal from the thermal therapy component, from an inner portion of the device configured to be placed against the patient or an outer portion of the device configured to face away from the patient, etc.) can rise with therapy and use at different rates. A detected change in temperature, or rate of change in temperature, can be used to determine if the patient is wearing the device while the thermal therapy is activated, or if the patient has activated therapy but is not wearing the device, as there is a detectable temperature difference between typical ambient room temperature and the temperature change associated with patient use. There is a further detectible temperature difference between patient use, against the skin or outside patient clothing, with thermal therapy versus patient use without thermal therapy, for example, if the patient is wearing the device but not activating thermal therapy.

Figure 17:
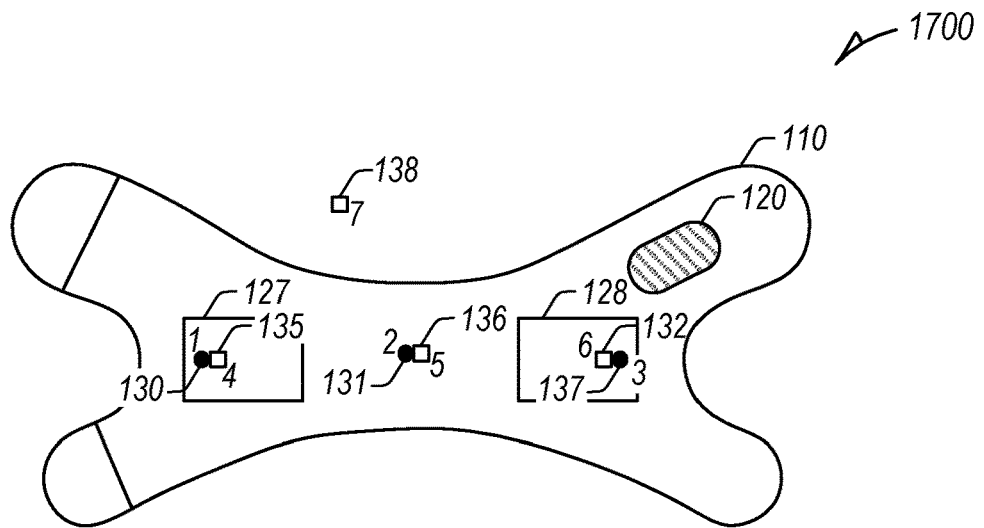
FIGS. 17-20 illustrate example sensor locations on different treatment devices.
Figure 18:
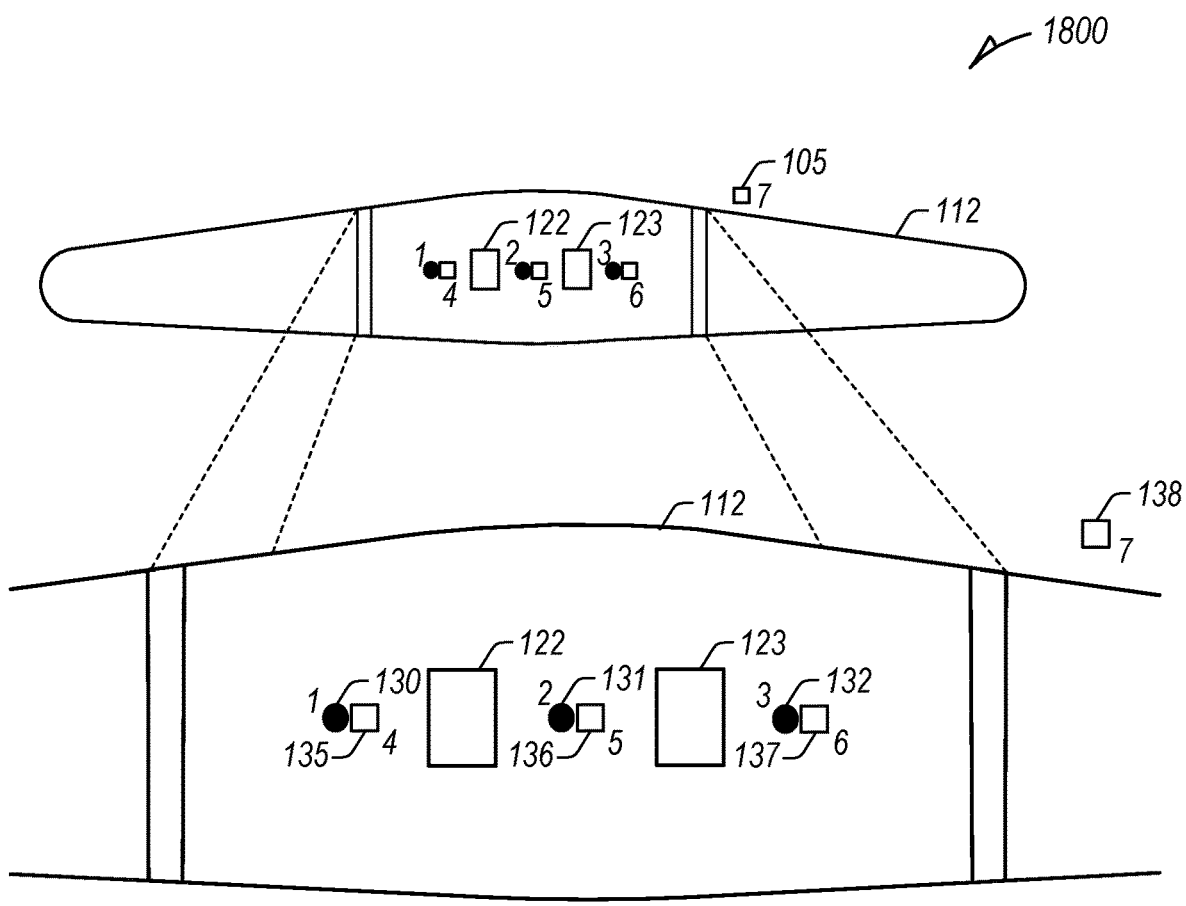

FIGS. 17 and 18 illustrate example treatment devices 1700, 1800 including a knee wrap 110 (or cuff) and a back wrap 112 (lumbar wrap), respectively, having treatment device control circuits 120 to control one or both of heat and electrical therapy. The knee wrap 110 includes first and second thermal therapy components 127, 128. The back wrap 112 includes first and second thermal therapy components 122, 123.

Each of the knee and back wraps 110, 112, in FIGS. 17-18 include and seven (7) separate temperature sensor locations, numbered, labeled, and marked as either an internal or an external surface temperature sensor to test different temperature sensor locations and configurations for compliance testing and to determine proper activation of any thermal therapy components. Internal surface temperature sensors include the first, second, and third temperature sensors 130-133 (configured to be located between the patient and the knee wrap 110 when the knee wrap 110 is worn), denoted by dark circles. External surface temperature sensors include the fourth, fifth, sixth temperature sensors 135-137, denoted by open boxes. A seventh temperature sensor 138 was tested as a control sensor away from the knee wrap 110.

Sensors away from the first and second thermal therapy components, on opposite internal and external surfaces, provided a better indication that the patient is wearing the device. Initial temperature changes once the brace is applied, rather suddenly, and remains relatively constant after 5 or 10 minutes. For example, a temperature difference between 3 and 7 degrees C. was observed between an internal sensor at the back of the knee at the popliteal region of the on the knee wrap 110 or the lumbar region of the back wrap 112 and the outermost location of front of each, the outer layer of the hook-and-loop closure near the treatment device control unit 120.

Additionally, sensors in close proximity to the thermal therapy components (e.g., within 1 inch, etc.) provide a better detection of appropriate activation of the thermal therapy. The observed temperature of the sensors tends to level out sooner when the device is worn against the patient than if the device is not worn. In contrast, if the device is not worn, the temperature of the pods continues to rise longer than if the knee wrap is not worn, suggesting that the human body acts as a type of constant heat sink. In certain examples, it may be advantageous to place one or more temperature sensors near the thermal therapy components but under the surface of the respective wrap.

Accordingly, in certain examples, at least 2 temperature sensors, and preferably at least 3 or more, can be required to detect activation of the thermal therapy components and confirm that the patient is wearing the device. To account for crossing of legs interfering with intended ambient temperature detection, or leaning or sitting, covering the sensor, etc., 2 to 5 sensors can be desired.

A control circuit can receive the temperature information from the one or more temperature sensors and use the received temperature information to determine an indication of patient compliance (e.g., that the patient is wearing the device while therapy is activated), as well as, in certain examples, confirming proper activation of the thermal therapy components.

In addition, as the body acts as a heat sink, the control circuit can use the received temperature information to determine if the patient is wearing the treatment device directly on the skin, or with a layer between the brace and the skin as prescribed. The control circuit can provide an indication of non-compliance if detected as directly against the skin, in certain examples, using one of the visual, audible, haptic, or small electric shocks. In certain examples, one or more treatment parameters can be lowered in response to the detected direct-on-skin use, such as reducing applied heat, etc.

Figure 19:
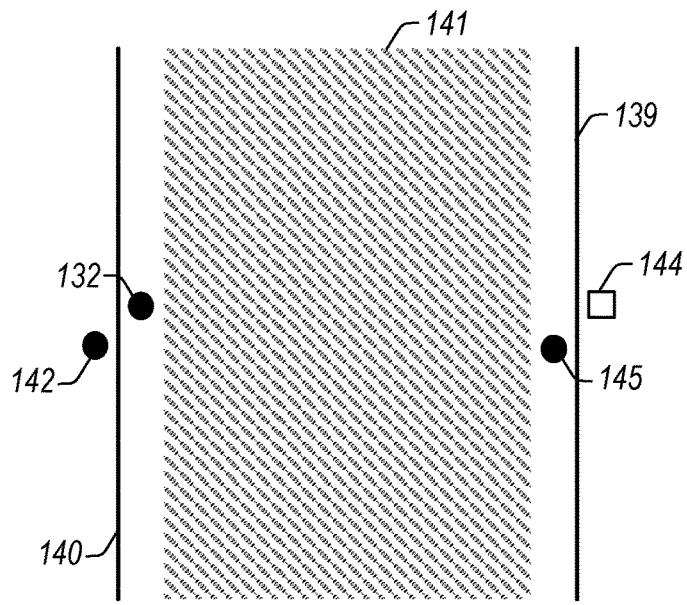

FIG. 19 illustrates example layers of a treatment device 1900, including inner layers 141 (e.g., padding material, rigid stays, etc.), internal material 140, external material 139, an external surface temperature sensor 144, first and second internal material temperature sensors 132, 145, and an interior surface temperature sensor 142. The second internal material temperature sensor 145, under the interior surface proximate a thermal therapy component, may be the best location to detect a proper functioning thermal therapy component.

Figure 20:
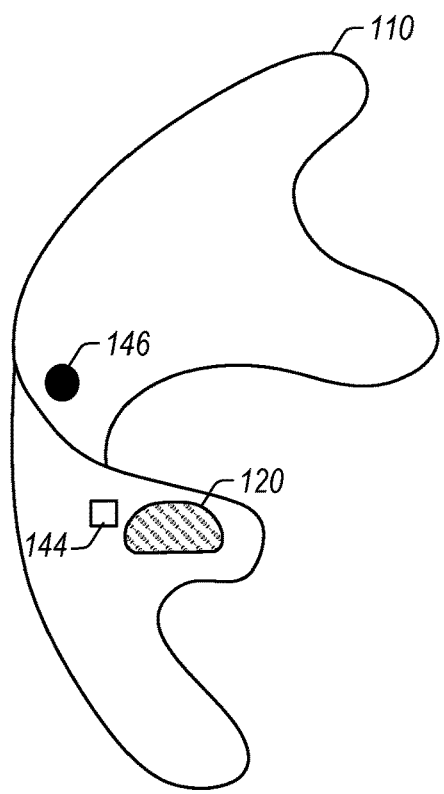

FIG. 20 illustrates an example knee cuff 110 treatment device control circuits 120 including an example locations of an interior surface temperature sensor 146 and an external surface temperature sensor 144 to determine if the patient is wearing the knee cuff 110.

FIGS. 21A-21D, 22A-22B, and 23-24 illustrate examples of modular devices or systems capable of operating independently from one or more treatment devices, supplementing treatment device operations and services, improving treatment device therapy by adding a response mechanism to adjust or reconfigure therapy in a closed-loop fashion, etc., in certain examples by altering one or more treatment parameters and in other examples by providing instruction to the patient through an application on a remote device or by providing one or more of an audible, visual, or haptic indication to the patient.

In other examples, the modular devices or systems can detect differences or divergence in sensed temperature information indicative of one or more adverse conditions. In an example, differences across the body, motion imbalance, generally changes in patient condition, reduction of blood flow to an extremity, hypothermia, hyperthermia, etc. can be detected by unexpected variance between sensed temperature information, such as between different temperature sensors (e.g., a temperature sensor on the foot and a temperature sensor on the thigh, etc.).

In certain examples, the modular device or system when worn can provide an elegant indication when rest or activity are above or below prescribed boundaries. For example, prescribed boundaries can be received, such as from a clinician or one or more other caregiver. If a patient is prescribed a period of recovery or low activity, the modular device can monitor activity, detect activity occurring above a threshold, and notify the patient that something is out of bounds by one or more of an audible, haptic, or visible indicator. In certain examples, the indicator can be provided in combination with a notification on a mobile device, which can explain to the patient what is out of bounds. Often, the reminder is enough to alter patient behavior, providing an elegant solution at a low cost, without an expensive display, in certain examples, without a Bluetooth or wireless communication circuit, without a rechargeable battery, etc.

In certain examples, the modular devices or systems, aside from adding remote monitoring to devices otherwise not able to perform such monitoring or feedback progress into adjusted treatment parameters or patient instructions, can be used in conjunction with different treatment devices on the patient. For example, one modular device can be placed on a knee wrap, such as via a hook-and-loop attachment, placed on the skin under the wrap, etc., and used to determine indications of patient compliance or patient condition, such as through communication to the modular device of the modular device location by the patient through the remote device, etc., at a first time. Then, at a second time, the same modular device can be placed on a shoulder wrap and used to determine indications of patient compliance or patient condition, such as through communication to the modular device of the modular device location by the patient through the remote device, etc., at a second time. In this way, one modular device can be used to track patient condition (e.g., improving or worsening patient condition) or compliance with multiple devices, in certain examples, having overlapping periods of treatment.

FIGS. 21A-21D illustrate an example modular temperature sensor system 2100 having a housing 157 with different attachments to different surfaces and optionally including a first temperature sensor 149 attached to a flexible cable 150, a second temperature sensor 151 configured to be located in the housing 157, and a physical connector 155 (e.g., a micro-USB or USB-C connector, etc.). In an example, the housing 157 is waterproof when closed, and can be attached to any number of surfaces including skin, clothing, treatment devices, etc.

Figure 21A:
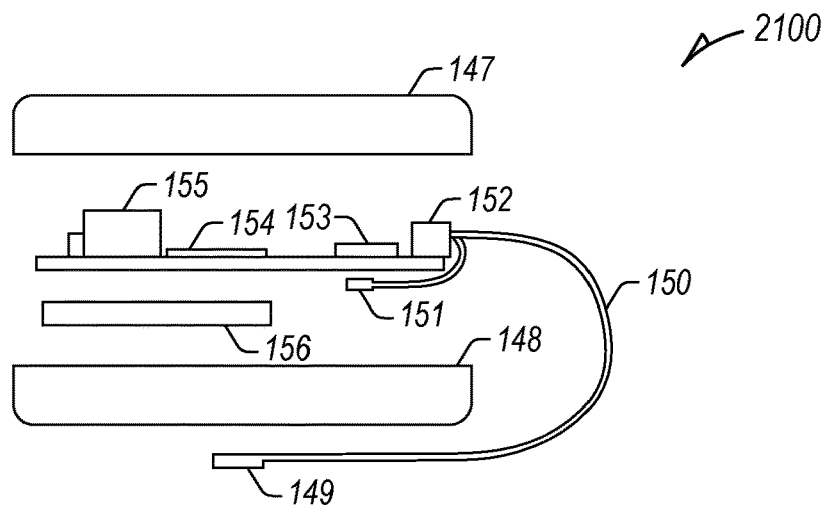
FIGS. 21A-21D illustrates an example modular sensor system including a temperature sensor.

FIG. 21A illustrates an example exploded view of the modular temperature sensor system 2100 including a case top 147, a case bottom 148, the first temperature sensor 149, a second temperature sensor 151, an on-board temp sensor 153, a battery 156, a Bluetooth communication circuit 154, and a connector for off-board temp sensors 152. The second temperature sensor 149 can configured to be located in and detect the temperature information from inside the housing 157 when closed.

Figure 21B:
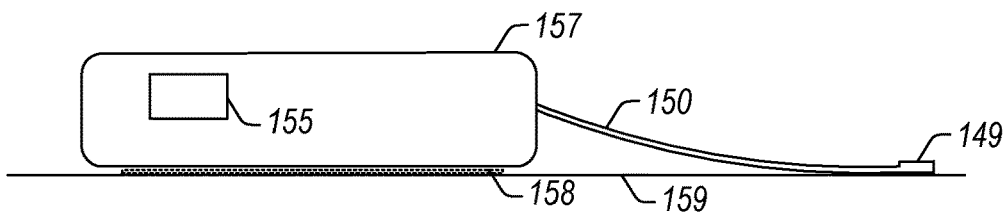

FIG. 21B illustrates a first attachment of the modular temperature sensor system 2100 to patient skin 159, such as by an adhesive 158 applied between the housing 157 and the skin 159.

Figure 21C:
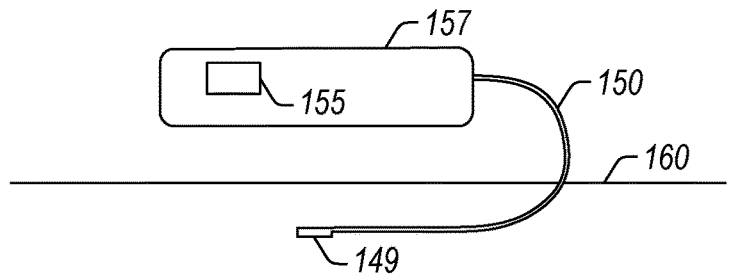

FIG. 21C illustrates an example second attachment of the modular temperature sensor system 2100 to a first barrier 160, including fabric or clothing. In this example, the first temperature sensor 149 can be place through the clothing (e.g., through a hole, etc.) while the second temperature sensor 151 remains inside the housing 157 to determine ambient temperature from inside the housing 157.

Figure 21D:
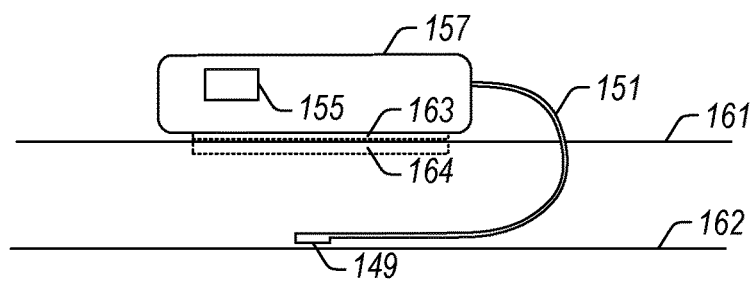

FIG. 21D illustrates an example third attachment of the modular temperature sensor system 2100 to a treatment device 161 by first and second magnets 163, 164, with the first temperature sensor 149 against skin 162 of a patient. In other examples, the modular temperature sensor system 2100 can be coupled using hook-and-loop attachment or adhesive, by a strap, etc. Further, in certain examples, certain attachments can be adjusted to carry one or more electrical indicators of the type of interface is being used.

For example, when using with a magnetic attachment, the magnet itself can be used to close an open circuit on the modular system such as to confirm a known attachment mechanism or reduce the possible unknown attachment mechanisms (e.g., one of two, but not the third, etc.).

Figure 22A:
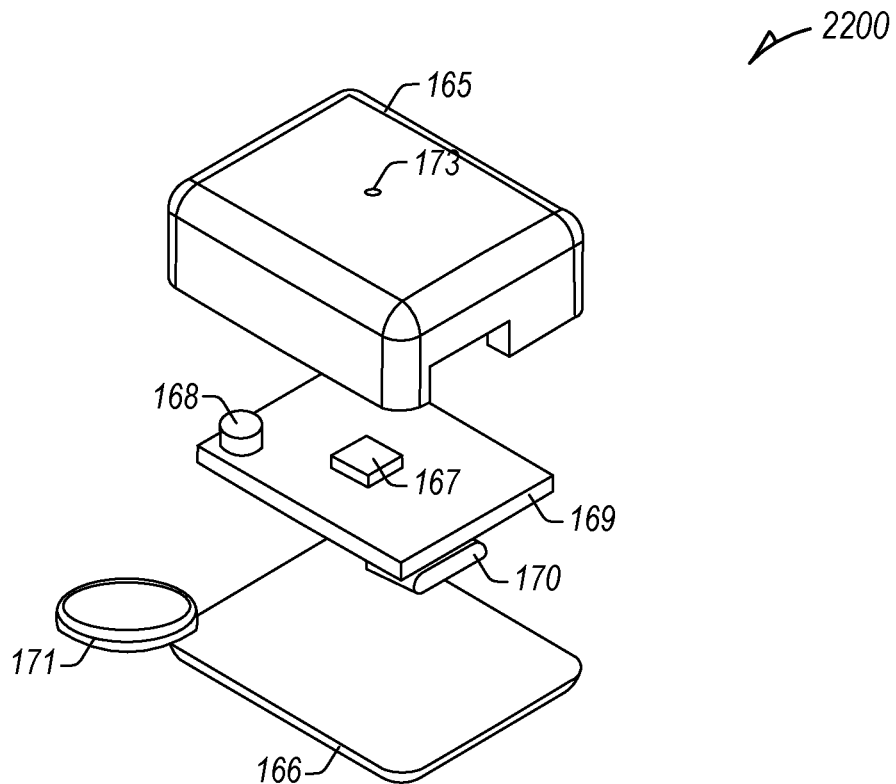
FIGS. 22A-22B illustrates an example modular sensor system including an activity sensor.
Figure 22B:
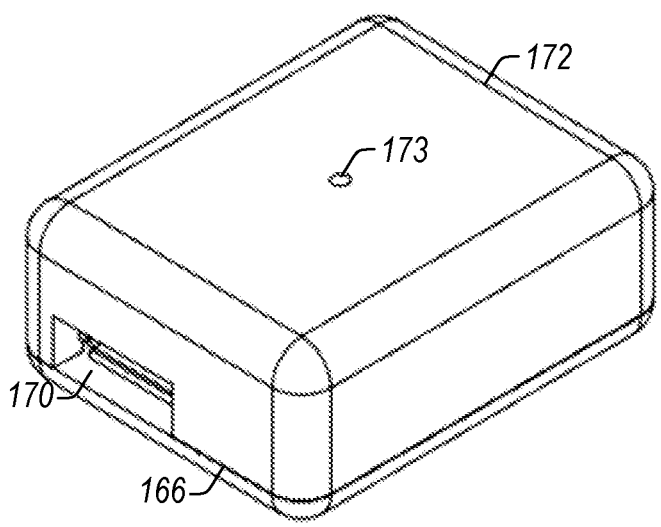

FIGS. 22A-22B illustrates an example modular motion sensor system 2200 including a PCB with a multi-axis accelerometer 169, a control circuit 167, an audible or haptic indicator 168, a physical connector 170 (e.g., a micro-USB or USB-C connector, etc.), a battery 171, a housing 172 having a top cover 165 and a bottom 166, and a visual indicator 173.

The housing 172 can be attached to any number of surfaces including skin, clothing, treatment devices, etc., using different attachment mechanisms shown or discussed herein, including hook-and-loop, adhesive, magnetic, a strap, a pin and catch, belt loop, or one or more other attachment mechanisms, etc.

Figure 23A:
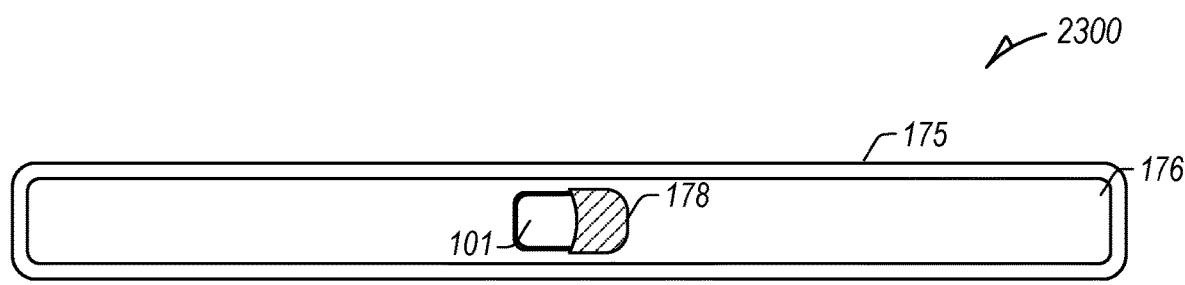
FIGS. 23A-23B and 24 illustrate example modular system placement.
Figure 23B:
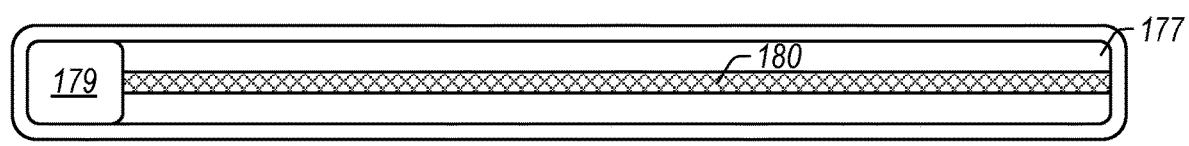

FIGS. 23A-23B illustrate front and back views of a modular placement systems 2300 including a modular strap 175 configured to place and secure a monitoring device 101 or one or more of the modular systems disclosed herein. The strap 175 includes a front side 176 having a pocket 178 (e.g., a spandex/nylon fabric pocket) configured to hold the monitoring device 101. The back side 177 includes a non-slip silicon strip 180 and a hook-and-loop attachment portion 179.

Figure 24:
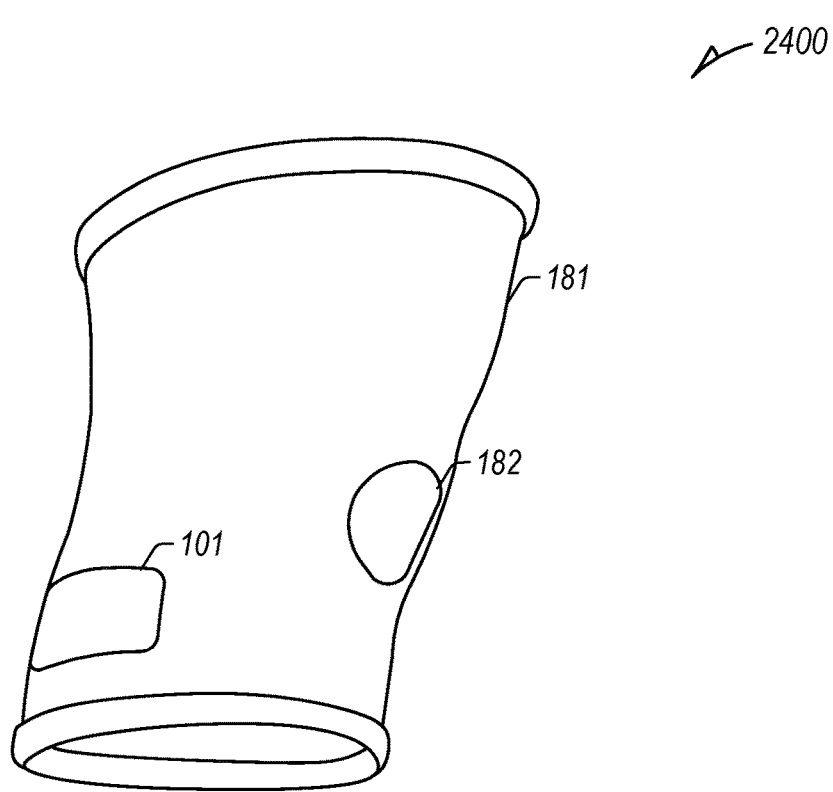

FIG. 24 illustrates an example modular placement systems 2400 including a sleeve 181 having a cutout for a kneecap 182 and a pocket to hold a monitoring device 101 or one or more of the modular systems disclosed herein.

Figure 25:
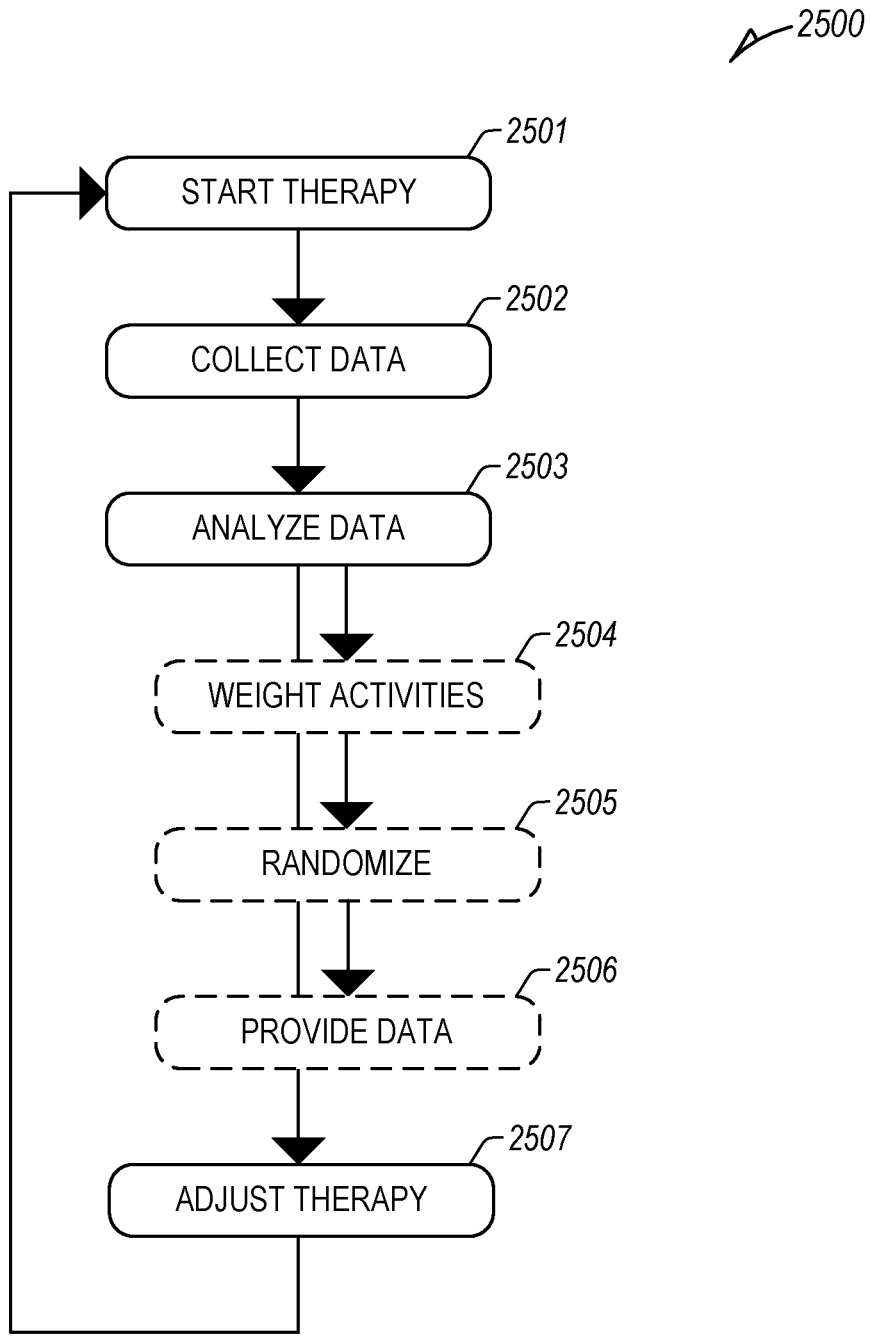
FIG. 25 illustrates an example treatment method.

FIG. 25 illustrates an example treatment method 2500 for analyzing collected data of a patient, analyzing the collected data, and adjusting a therapy using the analyzed data. In certain examples, one or more of the steps described herein can be performed by a control circuit of a monitoring device or a treatment device. In other examples, one or more of the steps described herein can be provided to a remote device, or a remote database, such as for analysis by one or more control circuits or computing resources separate from the monitoring device or the treatment device.

At step 2501, therapy can be provided, such as by a therapy component of a treatment device at a treatment location on a body of a patient. In certain examples, the therapy component can include at least one of an electrical therapy component or a thermal therapy component, such as described herein.

At step 2502, data can be collected, such as one or both of physical activity information from a motion sensor and temperature information from a temperature sensor. In certain examples, the physical activity information or the temperature information can be received by a control circuit further configured to analyze the collected, sensed, or received information. In certain examples, the data can include a therapy timestamp from the therapy component, or, separately, an indication of a therapy starting, such as using a detected increase in temperature or patient interaction with a prompt on a remote device, etc.

At step 2503, data can be analyzed, such as using one or more of the techniques described herein. In an example, physical activity information can be translated into one or more activity levels or otherwise used to determine one or more parameters associated with prompted or directed activities.

In an example, the received information can be analyzed, such as by a control circuit, to determine an indication of patient compliance, such as over a first period (e.g., a treatment period, or a number of discrete treatment periods, etc.) or with respect to a first compliance threshold (e.g., a binary determination of compliance, etc.). Further, the received information can be analyzed to determine an indication of patient condition, such as a determination of improving, stable, or worsening patient condition over a second time period (e.g., different than the first time period) or with respect to a baseline or one or more other previously determined indication of patient condition (e.g., such as to determine a change from a previous determination or a trend along multiple determinations).

In certain examples, the therapy component can provide treatment at step 2501 according to one or more treatment parameters, in certain examples including one or more of therapy duration (Td), therapy intensity (Ti), therapy area (Ta), pain level (P), activity level (A), or recovery measurement (R), etc. However, one or more of the treatment parameters can be adjusted based on different relationships of collected or analyzed data.

For example, as recovery metrics increase, therapy parameters can generally be reduced, such that, in certain examples, one or more of the therapy duration (Td), the therapy intensity (Ti), and the therapy area (Ta) can be roughly inversely proportionate to the recovery measurement (R). In other examples, as activity levels generally increase, therapy parameters can generally be reduced, such that, in certain examples, one or more of the therapy duration (Td), the therapy intensity (Ti), and the therapy area (Ta) can be roughly inversely proportionate to the activity level (A). In contrast, as pain metrics increase, therapy parameters can generally be increased, such that, in certain examples, one or more of the therapy duration (Td), the therapy intensity (Ti), and the therapy area (Ta) can be roughly proportionate to the pain level (P).

Although the measures are described above as roughly proportionate, such functions do not have to be linear. In certain examples, the different measures can be roughly proportionate to non-linear (e.g., proportionate to a square, a square root, or one or more other powers or exponents, etc.) functions of the different measures or parameters. In addition, different relationships of variables can be dynamic based on one or more other population metrics (e.g., demographics, etc.) or other factors (e.g., body part, injury, severity, etc.).

At step 2504, one or more activities, such as the prompted or directed activities, can be weighted based on a performance of determined patient condition for the respective activities. Identifying the prompted or directed activities associated with the most patient improvement and providing those activities more than activities with less improvement can improve patient outcome by increasing patient compliance.

At step 2505, the weighted activities can be randomized such that some variety of prompted or directed activities are still provided to the user, although with fewer of the activities where the patient is not showing improvement.

At step 2506, data can be provided to a user, such as the patient or one or more other users or caregivers. In certain examples, the determined indication of patient compliance and the determined indication of patient condition can be provided to a user or process. In another example, a control signal can be provided to control at least one of the electrical or thermal therapy component based on the determined indication of patient condition.

In other examples, at least one of a visual indicator, an audible indicator, or a haptic indicator can be provided to the user. The patient indicator can include at least two states, an in-compliance state and an out-of-compliance state. A patient indicator control signal can be provided to transition a state of the patient indicator based on the determined indication of patient compliance.

At step 2507, therapy can be adjusted, such as resulting from the analyzed data at 2503 or the randomly selected weighted activities at 2505. In certain examples, the determined indication of patient condition includes one of a worsening patient condition, a stable patient condition, or an improving patient condition over the second period, and a treatment parameter of the therapy component can be adjusted based on the determined indication of patient condition.

In an example, if the determined indication of patient condition indicates the worsening patient condition, a duration or magnitude of treatment can be increased or a time period between successive applications of the treatment be reduced. If the determined indication of patient condition indicates an improving patient condition, a duration or magnitude of the treatment can be reduced or a time period between successive applications of the treatment can be increased.

In other examples, therapy parameters can be adjusted based on aggregate determinations of improvement and pain. Levels for each directed activity can be determined and weighted, such as by collecting RMS or other values indicative of improvement or pain, and correlated to a specific suggested treatment or treatment parameter adjustment, etc.

Low power circuitry could be run for the life of the device with a primary battery. The systems described herein can remain on low power mode while not in use. The accelerometer can check for movement at different intervals and remain in low power mode until movement is detected. Optionally, a secondary battery can be charged using a connector, inductive coupling or using a motion-based energy capture/charging system or Peltier effect thermal charger. In other examples, the methods disclosed herein can be configured determine performance or efficacy of one or more other devices, such as different treatment wraps, temporary casts, or one or more other devices configured to be placed about a body part of the patient.

In an example, patient activities can be directed, or physical therapy exercise regimens can be determined, using patient physical activity information. For example, a physical therapy regimen can be automatically changed over time according to an increase or decrease in aggregate patient motion or detected range of motion. In other examples, the time of applied therapy can be automatically adjusted according to an increase or decrease in aggregate patient motion or detected range of motion. A decrease in patient mobility or aggregate motion can automatically increase the time of applied therapy or the number of therapy sessions per day (e.g., from one to two therapy sessions). Therapy instructions, prompts, summary information, progress information, or one or more other visual, audible, or haptic, or in certain examples, small electric shock indications can be provided, such as using a display of the remote device or through an application executed on the remote device, etc. Notifications to the patient or one or more other users or caregivers or processes that the patient is in compliance, partly in compliance, or not in compliance with the directed use can be provided. In certain examples, notifications can be provided using the remote device. In other examples, notifications can be provided by one or more indicators, or combinations of indicators and the remote device.

In certain examples, provided indications of a lack of compliance (e.g., visual indications, audible indications, etc.) can, in themselves, subsequently improve patient compliance. Further, detected temperature information can be used to determine device performance (e.g., proper functioning of the thermal therapy components), and indication of proper device performance can be provided to a user, further increasing patient compliance. In an example, a determination of patient compliance can be provided using a first indication (e.g., a first one of the visual, audible, haptic, or small electric shocks (an electric indicator)) and a determination of patient condition can be provided using a second indication (e.g., a second one of the visual, audible, haptic, or small electric shocks).

In an example, one or more treatment parameters can be modified. For example, motion information can be detected during therapy and analyzed. Patient improvement can be determined using the detected physical activity information. For example, range of motion can be determined using physical activity information. An increase in patient range of motion can indicate patient improvement. Patient range of motion can be detected, for example, using a difference in change of multiple sensors, using flex sensors in a device, or estimated using the amount of detected change from a single sensor during a directed exercise or movement. In other examples, aggregate patient motion can be used to determined patient improvement. For example, an increase in daily motion or motion during use of the device can indicate that the patient is improving. In other examples, patient gait metrics can be recorded and tracked and used to determine patient improvement. For example, changes in patient gait, such as patient limp, step rate, step force, ground contact time, etc., or differences in measurements between patient left and right side, can be used to determine patient improvement. A reduction in imbalance from left to right, or a general improvement (e.g., increase step rate, decreased ground contact time, etc.) can indicate patient improvement. An increase in patient improvement can trigger a change in treatment parameters or directed changes in patient physical therapy (e.g., exercises, movements, etc.). Conversely, a decrease in patient improvement (a detected patient worsening) can increase the time of therapy or number of daily therapies or trigger follow-up treatment or changes in patient physical therapy to respond to the patient condition.

In an example, patient compliance can be determined. For example, compliance can be determined based on temperature difference from ambient, as a function of ambient temperature or normal skin temperature. In certain examples, a temperature differential inside and outside of the device can be used to determine patient use independent from environmental changes and consistent across different ambient environments. For example, a temperature difference (from 0 to 120 degrees F.) given ambient temperature (from −40 to 120 degrees F.) can determine whether the device is being worn and therapy has been activated. The among of change to determine use can be a function of ambient temperature. The higher the ambient temperature, the lower the detected change between use and non-use, with and without thermal therapy.

In other examples, a measure of patient wellness can be determined using a device having both a thermal sensor and a motion sensor. For example, motion and temperature information can be detected and recorded. Patient physical activity information and temperature information can be used to calculate the amount of energy required by the patient to perform certain motions or activities. The calculated energy required, using temperature and physical activity information, can be used to provide an indication of patient wellness or level of fitness. In certain examples, patient motion and temperature information can be used to determine caloric efficiency, or changes in caloric efficiency, for repeatable activities over time.

In an example, one or more treatment parameters can be adjusted using body fat measurements from electrodes on the device. Bioelectric impedance of patient tissue proximate the device can be measured and used to determine body fate percentage, depending on the location of the device on the patient and patient demographic information. Determined body fat percentage, and detected changes, can be used to adjust treatment parameters. For example, the depth of treatment, or time or amplitude of treatment can be adjusted based on the determined body fat percentage.

The temperature information of a thermal therapy component changes with therapy in a largely predictable way. For example, a temperature measured in contact with a center of the fabric side of a thermal therapy component with respect to a thermal heat pack (e.g., an air-activated thermal device after exposure to air) will sharply increase in temperature for t=0 to 5 minutes, slowly increase from t=5 to 15 minutes, and steady output from t=15 to 60 minutes before gradually falling back down to a baseline temperature. An indication of appropriate device performance can be determined using a comparison of a detected temperature during operation with one or more characteristics of the example temperature relationship. An indication of proper detected performance can be provided to a user or the patient to increase patient compliance or trigger device or component replacement.

For example, a temperature sensor near the thermal therapy component can measure a therapy temperature profile. A detected increase in heat during therapy, for example, from the t=0 to 5 period, can determine device functionality. Other detections, such as a time above a certain temperature, or a temperature reached during therapy, can be used to detect faulty thermal therapy components.

The temperature sensor can further be configured to determine if the patient is re-using old thermal therapy components to activate the electromagnetic therapy. The device can count the number of changes in temperature information to determine how many thermal therapy components have been inserted into the device.

In certain examples, compliance notifications can be provided on the device itself, such as using a digital interface, with treatment length, battery life, remaining therapy time, etc. In other examples, an application on a remote device can provide additional compliance information, such as more detailed compliance information, or one or more of the remote device or the remote database can be used to provide one or more other communications of compliance or progress information to the patient or one or more other users or caregivers, such as by updating patient data in a remote database accessible by the patient or one or more other authorized users or caregivers, providing a summary email communication, etc. In certain examples, the device itself can provide a basic indication of compliance or non-compliance or triggered use or remaining therapy, such as by visible, audible, or haptic indications.

In other examples, stretch sensors sewn into the fabric of a device can be used to determine use, and in certain examples, range of motion or patient body changes. For example, a gradual change in patient size or measurement can indicate a worsening condition (e.g., swelling, etc.). If the patient does not wear or use the device, the stretch sensor will not detect changes. Changes in motion or stretch above a breathing threshold or involuntary motion, such as to detect patient exercise, etc., can be used to determine patient activity.

Examine measurement requirements include, for compliance, one or more of the following: measure when thermal therapy components are in the device (measure when the digital I/O reads low voltage, indicating coupling to device); create time stamp for beginning and end of therapy; track number of therapy sessions; Device Usage Percentage= (Total Usage (Hours)/(# of Days w/ Device×2 Hours))×100; ensure that device moves after pods are placed in the device (e.g., ensure the patient is putting the device on and wearing it while therapy is running).

For activity measurements: measure one or more of the following, and be able to differentiate whether these measurements were taken during therapy or outside of therapy: Steps; Acceleration-based physical activity information; Time@high activity level; Time@low activity level; Time@no activity level; Time spent moving; Time spent not moving; Guided Assessment Measurements (e.g., Knee Mobility (ROM); Balance; Gait; Timed Up and Go: (TUG: start seated in a chair, patient to stand and walk 10 meters; test is timed); CTSIB-M: (is a series of balance tests; 30 sec duration); metric or KPI; Time Sit to Stand; Walk Test: ROM.

Figure 26:
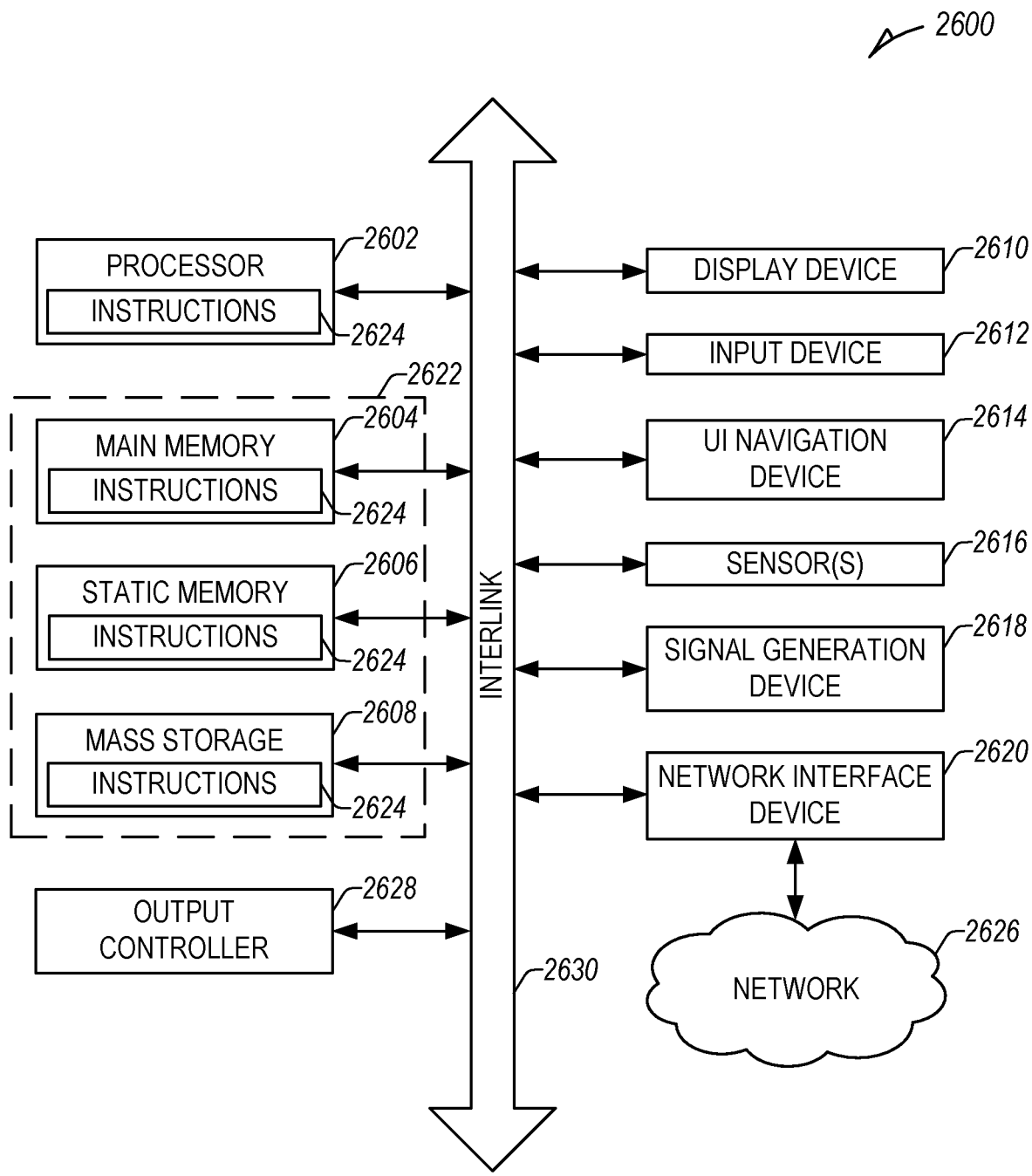
FIG. 26 illustrates an example computer system.

FIG. 26 illustrates an example machine 2600 upon which any one or more of the techniques (e.g., methodologies) discussed herein may perform. Portions of this description may apply to the computing framework of one or more of the devices described herein.

Examples, as described herein, may include, or may operate by, logic or a number of components, or mechanisms in the machine 2600. Circuitry (e.g., processing circuitry, an assessment circuit, etc.) is a collection of circuits implemented in tangible entities of the machine 2600 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 2600 follow.

In alternative embodiments, the machine 2600 may operate as a standalone device or may be connected (e.g., networked) to other machines. In a networked deployment, the machine 2600 may operate in the capacity of a server machine, a client machine, or both in server-client network environments. In an example, the machine 2600 may act as a peer machine in peer-to-peer (P2P) (or other distributed) network environment. The machine 2600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 2600 may include a hardware processor 2602 (e.g., a central processing unit (CPU), a graphics processing unit (GPU), a hardware processor core, or any combination thereof), a main memory 2604, a static memory (e.g., memory or storage for firmware, microcode, a basic-input-output (BIOS), unified extensible firmware interface (UEFI), etc.) 2606, and mass storage 2608 (e.g., hard drive, tape drive, flash storage, or other block devices) some or all of which may communicate with each other via an interlink (e.g., bus) 2630. The machine 2600 may further include a display unit 2610, an alphanumeric input device 2612 (e.g., a keyboard), and a user interface (UI) navigation device 2614 (e.g., a mouse). In an example, the display unit 2610, input device 2612, and UI navigation device 2614 may be a touch screen display. The machine 2600 may additionally include a signal generation device 2618 (e.g., a speaker), a network interface device 2620, and one or more sensors 2616, such as a global positioning system (GPS) sensor, compass, accelerometer, or one or more other sensors. The machine 2600 may include an output controller 2628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 2602, the main memory 2604, the static memory 2606, or the mass storage 2608 may be, or include, a machine-readable medium 2622 on which is stored one or more sets of data structures or instructions 2624 (e.g., software) embodying or utilized by any one or more of the techniques or functions described herein. The instructions 2624 may also reside, completely or at least partially, within any of registers of the processor 2602, the main memory 2604, the static memory 2606, or the mass storage 2608 during execution thereof by the machine 2600. In an example, one or any combination of the hardware processor 2602, the main memory 2604, the static memory 2606, or the mass storage 2608 may constitute the machine-readable medium 2622. While the machine-readable medium 2622 is illustrated as a single medium, the term "machine-readable medium" may include a single medium or multiple media (e.g., a centralized or distributed database, and/or associated caches and servers) configured to store the one or more instructions 2624.

The term "machine-readable medium" may include any medium that is capable of storing, encoding, or carrying instructions for execution by the machine 2600 and that cause the machine 2600 to perform any one or more of the techniques of the present disclosure, or that is capable of storing, encoding, or carrying data structures used by or associated with such instructions. Non-limiting machine-readable medium examples may include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine-readable media that do not include transitory propagating signals. Specific examples of non-transitory machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 2624 may be further transmitted or received over a communications network 2626 using a transmission medium via the network interface device 2620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.12 family of standards known as Wi-Fi®, IEEE 802.16 family of standards known as WiMax®), IEEE 802.15.4 family of standards, peer-to-peer (P2P) networks, among others. In an example, the network interface device 2620 may include one or more physical jacks (e.g., Ethernet, coaxial, or phone jacks) or one or more antennas to connect to the communications network 2626. In an example, the network interface device 2620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 2600, and includes digital or analog communications signals or other intangible medium to facilitate communication of such software. A transmission medium is a machine-readable medium.

Various embodiments are illustrated in the figures above. One or more features from one or more of these embodiments may be combined to form other embodiments. Method examples described herein can be machine or computer-implemented at least in part. Some examples may include a computer-readable medium or machine-readable medium encoded with instructions operable to configure an electronic device or system to perform methods as described in the above examples. An implementation of such methods can include code, such as microcode, assembly language code, a higher-level language code, or the like. Such code can include computer readable instructions for performing various methods. The code can form portions of computer program products. Further, the code can be tangibly stored on one or more volatile or non-volatile computer-readable media during execution or at other times.

Example 1 is a system comprising: a treatment device positionable at a treatment location on a body of a patient, the treatment device comprising a therapy component including at least one of an electrical therapy component or a thermal therapy component configured to apply a treatment at the treatment location; a motion sensor configured to detect physical activity of the patient; and a control circuit configured to: receive physical activity information from the motion sensor; determine an indication of patient compliance using the received physical activity information occurring over a first period or with respect to a first compliance threshold; determine an indication of patient condition using the received physical activity information occurring over a second period or with respect to a previously determined indication of patient condition; and provide the determined indication of patient compliance and the determined indication of patient condition to a user or process.

In Example 2, the subject matter of Example 1 includes, wherein the control circuit is configured to provide a control signal to control at least one of the electrical or thermal therapy component based on the determined indication of patient condition.

In Example 3, the subject matter of Examples 1-2 includes, wherein the control circuit is configured to receive a prescribed treatment, to determine the indication of patient compliance based on a comparison of the received physical activity information occurring over the first period to the prescribed treatment.

In Example 4, the subject matter of Examples 1-3 includes, a patient indicator including at least one of a visual indicator, an audible indicator, or a haptic indicator, the patient indicator comprising at least two states, wherein the control circuit is configured to provide a patient indicator control signal to transition a state of the patient indicator based on the determined indication of patient compliance, wherein the at least two states comprise an in-compliance state and an out-of-compliance state.

In Example 5, the subject matter of Example 4 includes, wherein the control circuit is configured to determine an indication of patient use using the received physical activity information, the determined indication of patient use indicating that the patient is wearing or is not wearing the treatment device, wherein the control circuit is configured to transition the patient indicator to an on state to provide a visual, audible, or haptic response when the determined indication of patient compliance indicates that the patient is out of compliance and the determined indication of patient use indicates that the patient is wearing the treatment device.

In Example 6, the subject matter of Example 5 includes, wherein the patient indicator includes the haptic indicator, wherein the at least two states comprise an off state wherein the haptic indicator does not provide a haptic response and an on state wherein the haptic indicator provides the haptic response.

In Example 7, the subject matter of Examples 1-6 includes, wherein the first period comprises a daily period, wherein, to determine the indication of patient compliance, the control circuit is configured to determine if the received physical activity information exceeds an activity compliance threshold over the first period.

In Example 8, the subject matter of Examples 1-7 includes, a temperature sensor configured to detect temperature information, wherein control circuit is configured to receive temperature information from the temperature sensor and to determine the indication of patient compliance using the received physical activity information and the received temperature information occurring over the first period.

In Example 9, the subject matter of Example 8 includes, wherein the control circuit is configured to determine the indication of patient compliance if the received temperature information comprises one of an increase in temperature that exceeds a first temperature compliance threshold or a temperature gradient at different locations of the treatment device that exceeds a second temperature compliance threshold.

In Example 10, the subject matter of Examples 8-9 includes, wherein the temperature sensor includes three separate temperature sensors configured to be located at different locations of the treatment device, including: first and second temperature sensors configured to be located on opposing sides of the treatment device when the treatment device is in operation; and a third temperature sensor located proximate the thermal therapy component on the treatment device, wherein the control circuit is configured to determine the indication of patient compliance using temperature information from the first and second temperature sensors, and wherein the control circuit is configured to determine an indication of desired thermal therapy function of the thermal therapy component using temperature information from the third temperature sensor.

In Example 11, the subject matter of Examples 8-10 includes, wherein the control circuit is configured to determine separate first and second indications of patient compliance for the first period using the received physical activity information and the received temperature information respectively, wherein the control circuit is configured to discard the determined separate indications of patient compliance for the first period if the determined first indication of patient compliance is different than the determined second indication of patient compliance.

In Example 12, the subject matter of Examples 1-11 includes, wherein the second period is longer than the first period, wherein the determined indication of patient condition includes one of a worsening patient condition, a stable patient condition, or an improving patient condition over the second period, wherein the control circuit is configured to adjust a treatment parameter of the therapy component based on the determined indication of patient condition.

In Example 13, the subject matter of Example 12 includes, wherein the control circuit is configured to increase a duration or magnitude of the treatment, or to reduce a time period between successive applications of the treatment, if the determined indication of patient condition indicates the worsening patient condition, wherein the control circuit is configured to reduce a duration or magnitude of the treatment, or to increase a time period between successive applications of the treatment, if the determined indication of patient condition indicates the improving patient condition.

In Example 14, the subject matter of Example 13 includes, wherein the therapy component comprises the electrical therapy component configured to apply an electrical therapy at the treatment location at a first time within the second period, wherein the control circuit is configured to increase a duration or magnitude of the electrical therapy for a subsequent application of the electrical therapy, or to reduce a time period between successive applications of the electrical therapy, if the determined indication of patient condition indicates the worsening patient condition.

In Example 15, the subject matter of Examples 13-14 includes, wherein the therapy component comprises the thermal therapy component configured to apply a thermal therapy at the treatment location at a first time within the second period, wherein the control circuit is configured to increase a duration of the thermal therapy for a subsequent application of the thermal therapy, or to reduce a time period between successive applications of the thermal therapy, if the determined indication of patient condition indicates the worsening patient condition.

In Example 16, the subject matter of Examples 1-15 includes, wherein, to determine the indication of patient condition, the control circuit is configured to receive an indication of a patient prompt, and to receive physical activity information in a time period following the received indication of the patient prompt and associated with the prompt.

In Example 17, the subject matter of Example 16 includes, wherein the patient prompt comprises one of a plurality of available prompts, wherein the control circuit is configured to determine separate indication of patient condition for each of the plurality of prompts, wherein the control circuit is configured to select a subsequent patient prompt from the plurality of prompts as a random function of the plurality of prompts weighted by the determined separate indications of patient condition for each of the plurality of prompts.

In Example 18, the subject matter of Examples 1-17 includes, a wrap positionable at the treatment location, wherein the treatment device and the motion sensor are integrated into or onto the wrap.

In Example 19, the subject matter of Example 18 includes, wherein the integrated motion sensor is positioned on the wrap at a location having a substantially large moment arm of movement associated with the treatment location of the body.

In Example 20, the subject matter of Examples 1-19 includes, a wrap positionable at the treatment location on the body of the patient, the wrap comprising the treatment device, the electrical therapy component, and the thermal therapy component; and a separate self-contained monitoring device configured to monitor treatment of the treatment device and use of the treatment device by the patient, the monitoring device comprising a housing, the housing including the motion sensor and the control circuit.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

The above detailed description is intended to be illustrative, and not restrictive. The scope of the disclosure should, therefore, be determined with references to the appended claims, along with the full scope of equivalents to which such claims are entitled.

What is claimed is:

1. A system comprising:
    a self-contained monitoring device including a housing,
    a first temperature sensor in the housing configured detect an ambient temperature of the housing;
    a second temperature sensor located outside of the housing configured to detect a temperature external to the housing;
    a control circuit configured to:
        receive an indication of a prescribed treatment;
        receive temperature information from the first and second temperature sensors;
        determine an indication of patient compliance to the prescribed treatment using the received temperature information occurring over a first period; and
        provide the determined indication of patient compliance to a user or process.

2. The system of claim 1, wherein the control circuit is configured to determine the indication of patient compliance using the received temperature information occurring over the first period with respect to a first temperature compliance threshold.

3. The system of claim 2, wherein the control circuit is configured to determine the indication of patient compliance if the received temperature information comprises an increase in temperature that exceeds the first temperature compliance threshold.

4. The system of claim 1, wherein the control circuit is configured to determine the indication of patient compliance using a temperature gradient between the temperature information from the first and second temperature sensors and a second temperature compliance threshold.

5. The system of claim 4, wherein the control circuit is configured to determine the indication of patient compliance if the temperature gradient between the temperature information from the first and second temperature sensors exceeds the second temperature compliance threshold.

6. The system of claim 5, wherein the control circuit is configured to determine the indication of patient compliance if the received temperature information occurring over the first period exceeds a first temperature compliance threshold and if the temperature gradient between the temperature information from the first and second temperature sensors exceeds the second temperature compliance threshold.

7. The system of claim 1, comprising:
    a treatment device positionable at a treatment location on a body of the patient, the treatment device comprising a therapy component including at least one of an electrical therapy component or a thermal therapy component configured to apply a treatment at the treatment location.

8. The system of claim 7, wherein the control circuit is configured to provide a control signal to control at least one of the electrical or thermal therapy component based on the determined indication of patient compliance.

9. The system of claim 7, wherein at least one of the treatment device or the self-contained monitoring device includes an interface to removably position and secure the self-contained monitoring device on the treatment device.

10. The system of claim 1, wherein the self-contained monitoring device includes a first indicator,
    wherein the control circuit is configured to provide the determined indication of patient compliance using the first indicator.

11. The system of claim 1, comprising:
    a motion sensor configured to detect physical activity of the patient,
    wherein the control circuit is configured to:
    receive physical activity information from the motion sensor; and
    determine the indication of patient compliance using the received physical activity information and the received temperature information occurring over the first period.

12. The system of claim 11, wherein the control circuit is configured to determine an indication of patient condition using the received physical activity information occurring over a second period or with respect to a previously determined indication of patient condition,
    wherein the control circuit is configured to provide the determined indication of patient compliance and the determined indication of patient condition to the user or process.

13. A method comprising:
    detecting an ambient temperature in a housing of a self-contained monitoring device using a first temperature sensor in the housing;
    detecting a temperature external to the housing using a second temperature sensor located outside of the housing; and
    using a control circuit:
        receiving an indication of a prescribed treatment;
        receiving temperature information from the first and second temperature sensors;
        determining an indication of patient compliance to the prescribed treatment using the received temperature information occurring over a first period; and
        providing the determined indication of patient compliance to a user or process.

14. The method of claim 13, wherein determining the indication of patient compliance comprises comparing the received temperature information occurring over the first period to a first temperature compliance threshold.

15. The method of claim 13, wherein determining the indication of patient compliance comprises comparing a temperature gradient between the temperature information from the first and second temperature sensors to a second temperature compliance threshold.

16. The method of claim 15, wherein determining the indication of patient compliance comprises:
    determining that the received temperature information occurring over the first period exceeds a first temperature compliance threshold; and determining that the temperature gradient between the temperature information from the first and second temperature sensors exceeds the second temperature compliance threshold.

17. The method of claim 13, comprising providing, using the control circuit, the determined indication of patient compliance using a first indicator of the self-contained monitoring device.

18. A system comprising:
a self-contained monitoring device including a housing and a first temperature sensor; and
a control circuit configured to:
receive an indication of a prescribed treatment;
receive temperature information from the first temperature sensor;
determine an indication of patient compliance with the prescribed treatment using the received temperature information from the first temperature sensor occurring over a first period; and
provide the determined indication of patient compliance with the prescribed treatment to a user or process.

19. The system of claim 18, wherein the self-contained monitoring device includes a second temperature sensor, separate from the first temperature sensor,
wherein the control circuit is configured to:
receive temperature information from the first and second temperature sensors; and
determine the indication of patient compliance to the prescribed treatment using the received temperature information from the first and second temperature sensors occurring over the first period.

20. The system of claim 19, wherein the control circuit is configured to determine the indication of patient compliance using a temperature gradient between the temperature information from the first and second temperature sensors and a temperature compliance threshold.

* * * * *